US011499062B2

(12) United States Patent
Gotou et al.

(10) Patent No.: US 11,499,062 B2
(45) Date of Patent: Nov. 15, 2022

(54) INK, INK SET, INK CONTAINER, IMAGE FORMING METHOD, AND IMAGE FORMING APPARATUS

(71) Applicant: RICOH COMPANY, LTD., Tokyo (JP)

(72) Inventors: Hiroshi Gotou, Kanagawa (JP);
Yoshiaki Masuda, Shizuoka (JP);
Masahiko Ishikawa, Shizuoka (JP);
Masaki Kudo, Kanagawa (JP);
Kazuhiko Umemura, Kanagawa (JP);
Keita Katoh, Superior, CO (US);
Akihiko Matsuyama, Shizuoka (JP);
Masayasu Nonogaki, Shizuoka (JP);
Takeshi Shibuya, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 489 days.

(21) Appl. No.: 16/611,141

(22) PCT Filed: Jun. 27, 2018

(86) PCT No.: PCT/JP2018/025797
§ 371 (c)(1),
(2) Date: Nov. 5, 2019

(87) PCT Pub. No.: WO2019/004488
PCT Pub. Date: Jan. 3, 2019

(65) Prior Publication Data
US 2020/0157366 A1 May 21, 2020

(30) Foreign Application Priority Data

Jun. 28, 2017 (JP) .............................. JP2017-126228
Apr. 4, 2018 (JP) .............................. JP2018-072208

(51) Int. Cl.
| C09D 11/102 | (2014.01) |
| C09D 11/107 | (2014.01) |
| C09D 11/36 | (2014.01) |
| C09D 11/38 | (2014.01) |
| C09D 11/40 | (2014.01) |
| B41M 5/00 | (2006.01) |

(52) U.S. Cl.
CPC ............ *C09D 11/107* (2013.01); *C09D 11/36* (2013.01); *C09D 11/38* (2013.01); *C09D 11/40* (2013.01); *B41M 5/0023* (2013.01)

(58) Field of Classification Search
CPC ......... C08G 77/46; C08L 71/02; C08L 83/06; C09D 11/40; C09D 11/322
USPC ................................................. 523/160, 161
See application file for complete search history.

(56) References Cited

U.S. PATENT DOCUMENTS

| 5,395,434 | A | * | 3/1995 | Tochihara | ............... | C09D 11/38 |
| | | | | | | 347/100 |
| 11,274,221 | B2 | * | 3/2022 | Umemura | ............ | C09D 11/322 |
| 2004/0196343 | A1 | | 10/2004 | Maekawa et al. |
| 2005/0093947 | A1 | | 5/2005 | Maekawa et al. |
| 2009/0220748 | A1 | | 9/2009 | Kanaya et al. |
| 2010/0196602 | A1 | | 8/2010 | Koyano et al. |
| 2011/0057981 | A1 | | 3/2011 | Aruga et al. |
| 2013/0169724 | A1 | | 7/2013 | Gotou |
| 2013/0323474 | A1 | | 12/2013 | Gotou et al. |
| 2014/0002539 | A1 | | 1/2014 | Goto et al. |
| 2014/0204156 | A1 | | 7/2014 | Gotou |
| 2014/0240391 | A1 | | 8/2014 | Goto et al. |
| 2014/0368572 | A1 | | 12/2014 | Goto |
| 2015/0030818 | A1 | | 1/2015 | Fujii et al. |
| 2015/0035896 | A1 | | 2/2015 | Gotou et al. |
| 2015/0077480 | A1 | | 3/2015 | Fujii et al. |
| 2015/0079358 | A1 | | 3/2015 | Gotou et al. |
| 2015/0103116 | A1 | | 4/2015 | Gotou |
| 2015/0307729 | A1 | | 10/2015 | Gotou et al. |
| 2016/0215152 | A1 | | 7/2016 | Yamamoto et al. |
| 2016/0333208 | A1 | | 11/2016 | Gotou et al. |
| 2017/0009092 | A1 | | 1/2017 | Gotou et al. |
| 2017/0182770 | A1 | | 6/2017 | Gotou |
| 2017/0369725 | A1 | | 12/2017 | Mitsuyoshi et al. |
| 2018/0030292 | A1 | | 2/2018 | Gotou et al. |

FOREIGN PATENT DOCUMENTS

| CN | 101151334 | | 3/2008 |
| CN | 101784621 | | 7/2010 |
| CN | 103429677 | | 12/2013 |
| CN | 103448403 | | 12/2013 |
| CN | 103874738 | | 6/2014 |
| CN | 103935148 | | 7/2014 |
| CN | 105820660 | | 8/2016 |
| EP | 1533348 | | 5/2005 |
| EP | 3 048 143 A1 | | 7/2016 |
| EP | 3239255 | | 11/2017 |
| EP | 3 279 278 A1 | | 2/2018 |
| JP | 2003-246954 | | 9/2003 |
| JP | 2004-107647 | | 4/2004 |
| JP | 2005-097597 | | 4/2005 |
| JP | 2005-161834 | | 6/2005 |
| JP | 2008-231211 | | 10/2008 |
| JP | 2011-046035 | * | 3/2011 |
| JP | 2012-207202 | | 10/2012 |
| JP | 2013-87139 | | 5/2013 |
| JP | 2013-248763 | | 12/2013 |
| JP | 2014-094998 | | 5/2014 |
| JP | 2016-125057 | | 7/2016 |
| JP | 2016-138253 | | 8/2016 |
| JP | 2016-216701 | | 12/2016 |
| WO | WO2016/104294 A1 | | 6/2016 |

OTHER PUBLICATIONS

Machine translation of JP 2011-046035 (Year: 2011).*
(Continued)

*Primary Examiner* — Doris L Lee
(74) *Attorney, Agent, or Firm* — Grüneberg and Myers, PLLC

(57) ABSTRACT

An ink contains at least one kind of polyether-modified siloxane compound and at least one kind of aliphatic alcohol alkylene oxide compound.

13 Claims, 5 Drawing Sheets

(56) References Cited

OTHER PUBLICATIONS

Japanese Office Action dated Mar. 29, 2022 in Japanese Patent Application No. 2018-072208, with English translation, 11 pages.
Chinese Office Action dated Aug. 31, 2021 in Chinese Patent Application No. 201880031395.8, 23 pages with English Translation.
International Search Report and Written Opinion dated Sep. 21, 2018 in PCT/JP2018/025797 filed on Jun. 27, 2018.
European Communication pursuant to Article 94(3) EPC dated Jun. 24, 2022, in European Application No. 18753470.6, 4 pages.

* cited by examiner

INK, INK SET, INK CONTAINER, IMAGE FORMING METHOD, AND IMAGE FORMING APPARATUS

TECHNICAL FIELD

The present invention relates to an ink, an ink set, an ink container, an image forming method, and an image forming apparatus.

BACKGROUND ART

Inkjet recording methods are suitable to easily form color images. In addition, its running cost is inexpensive, so that the inkjet recording method widely and rapidly diffuses. Of the ink for use in the image forming method, aqueous pigment ink in which pigment particulates are dispersed in water is now appealing. That pigment has a composition similar to those of coloring materials for use in typical commercial printing ink. Therefore, texture of printed matter using the pigment is expected to become close to that of commercial printing. However, recording on commercial printing paper or publishing printing coated paper using the aqueous pigment ink causes beading because ink absorption is slow.

In an attempt to solve this problem, for example, inks for inkjet recording containing water, a water-soluble organic solvent, a surfactant, and a coloring material have been proposed in JP-2012-207202-A and JP-2014-94998-A. As the water-soluble organic solvent, polyhydric alcohols and particular amide compounds having an equilibrium moisture content of 30 percent by mass or greater at 23 degrees C. and a relative humidity of 80 percent have been used. In addition, as the surfactant, at least one of silicone-based surfactants, fluorochemical surfactants, and acetylene glycol-based surfactants is used. In addition, to enhance defoaming property of ink, using a defoaming agent has been proposed in JP-2005-97597-A to solve the foaming issue.

As described above, to form high-quality image on commercial printing paper or publishing printing coated paper, ink having a high viscosity and a high permeation property has been proposed, which easily produces foams, resulting in a filling property problem. To solve this filling property problem, a defoaming agent is used. However, its use makes it difficult to secure discharging stability of ink

CITATION LIST

Patent Literature

[PTL 1] JP-2012-207202-A
[PTL 2] JP-2014-94998-A
[PTL 3] JP-2005-97597-A

SUMMARY OF INVENTION

Technical Problem

Typical ink fails to optimize the relation between the dynamic surface tension for a surface life of 15 msec according to maximum bubble pressure technique and the static surface tension. Therefore, the ink is easily wet on a repelling ink film of the nozzle plate of an inkjet head, thereby degrading discharging stability due to attachment of the ink on the nozzle. In addition, for a use of a silicone-based surfactant or a fluorochemical surfactant, the surface tension of ink deteriorates so that the ink tends to produce foams. Defoaming is difficult due to an increase of viscosity. As a result, when an inkjet head is filled with the ink, foams remain in the head liquid chamber, which causes non-discharging and makes it difficult to secure continuous discharging stability.

Ink using a defoaming agent to enhance defoaming property of the ink contains a dispersion which can be dispersed in water while enveloping a coloring material in a polymer. It also contains an acetyleneglycol-based surfactant and an ethyleneoxy-modified silicone compound having a particular structure as defoaming agent. However, this defoaming agent is not easily dissolved in aqueous ink on account of the defoaming mechanism, so that it adheres to, for example, an ink flow path or a nozzle plate of an inkjet head, which further degrades discharging stability.

As described above, to form high-quality images on commercial printing paper or publishing printing coated paper, ink having a high viscosity and a high permeation property has been proposed. However, such ink easily produces foams, causing a filling property problem. To solve this filling property problem, using a defoaming agent is not suitable considering securing discharging stability of ink as described above.

The present disclosure is to provide ink striking a balance between beading and discharging stability.

Solution to Problem

The ink of the present disclosure to solve this issue contains at least two kinds of surfactants, which are at least one kind of polyether-modified siloxane compound and at least one kind of aliphatic alcohol alkylene oxide compound.

Advantageous Effects of Invention

According to the present disclosure, an ink is provided which strikes a balance between beading and discharging stability.

DESCRIPTION OF EMBODIMENTS

Figure 1:
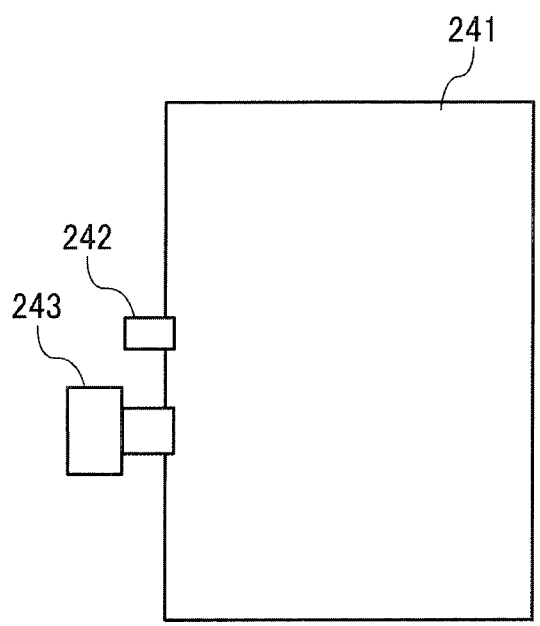
FIG. 1 is a schematic diagram illustrating an example of the ink bag of the ink container according to an embodiment of the present invention.

Aspects of the present disclosure are, for example, as follows.

1. An ink contains at least one kind of polyether-modified siloxane compound and at least one kind of aliphatic alcohol alkylene oxide compound.

2. The ink according to 1 mentioned above, wherein the polyether-modified siloxane compound is at least one member selected from the group consisting of compounds represented by the following Chemical formula III.

Chemical formula III

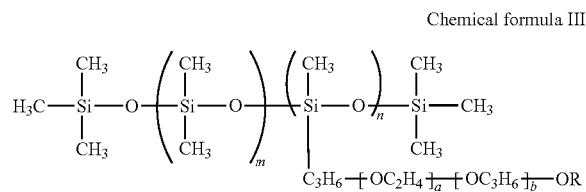

In Chemical formula III, m represents 0 or an integer of from 1 to 23 and n represents an integer of from 1 to 10, a represents an integer of from 1 to 23 and b represents 0 or an integer of from 1 to 23. R represents a hydrogen atom or an alkyl group having 1 to 4 carbon atoms.

3. The ink according to 2 mentioned above, wherein the compound represented by the Chemical Formula III is represented by any one of the following Chemical formulae VI to IX.

Chemical formula VI

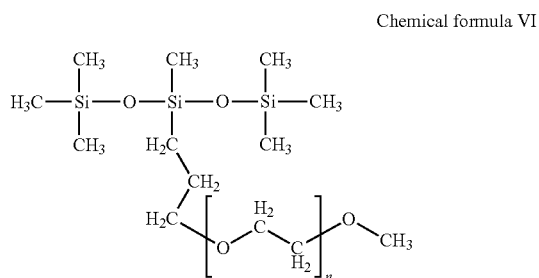

In Chemical formula VI, n represents an integer of from 2 to 17.

Chemical formula VII

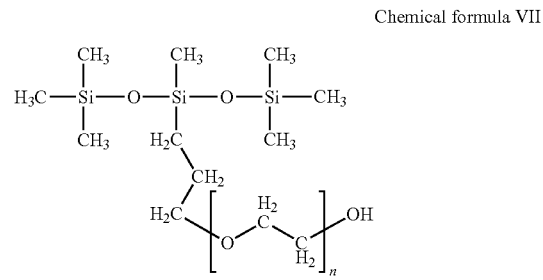

In Chemical formula VII, n represents an integer of from 2 to 17.

Chemical formula VIII

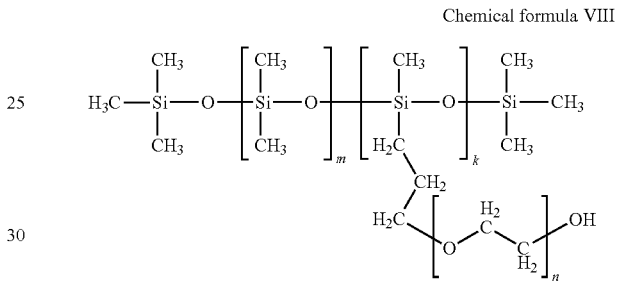

In Chemical formula VIII, k represents an integer of from 1 to 2, m represents 0 or an integer of from 1 to 5, and n represents an integer of from 3 to 17.

Chemical formula IX

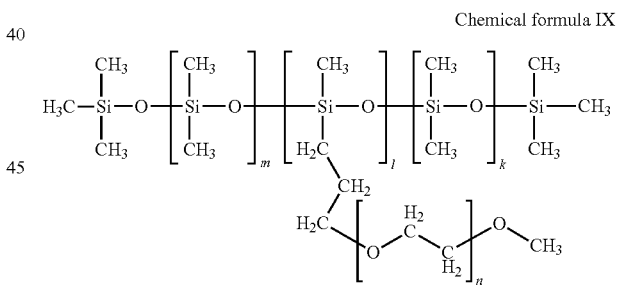

In Chemical formula IX, k+m represents 0 or an integer of from 1 to 7, l represents an integer of from 1 to 2, and n represents an integer of from 2 to 16.

4. The ink according to 1 mentioned above, wherein the polyether-modified siloxane compound is at least one member selected from the group consisting of the compounds represented by the following Chemical formula X to XII.

Chemical formula X

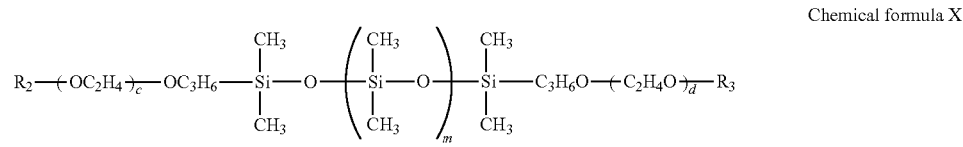

In Chemical formula X, m represents an integer of from 1 to 8 and c and d each, independently represent integers of from 1 to 10. $R_2$ and $R_3$ each, independently represent hydrogen atoms or alkyl groups having 1 to 4 carbon atoms.

Chemical formula XI

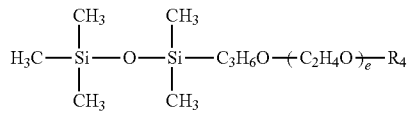

In Chemical formula XI, e represents an integer of from 1 to 8 and $R_4$ represents a hydrogen atom or an alkyl group having 1 to 4 carbon atoms.

Chemical formula XII

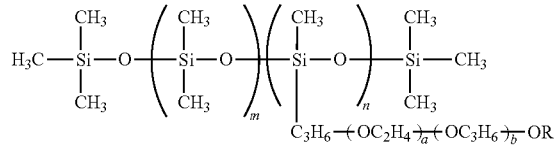

In Chemical formula XII, f represents an integer of from 1 to 8. $R_5$ represents a polyether group represented by the following chemical formula A.

Chemical formula A

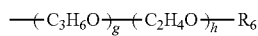

In Chemical formula A, g represents 0 or an integer of from 1 to 23 and h represents 0 or an integer of from 1 to 23, excluding the case in which g and h are 0 at the same time. $R_6$ represents a hydrogen atom or an alkyl group having 1 to 4 carbon atoms.

5. The ink according to any one of 1 to 4 mentioned above, wherein the aliphatic alcohol alkylene oxide compound is at least one member selected from the group consisting of the compounds represented by the following Chemical formula IV or the group consisting of the compounds represented by the following Chemical formula XIV.

Chemical formula IV

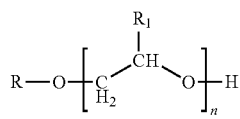

In Chemical formula IV, R represents an alkyl group having 8 to 13 carbon atoms, $R_1$ represents a hydrogen atom or a methyl group, and n represents an integer of from 2 to 12.

Chemical formula XIV

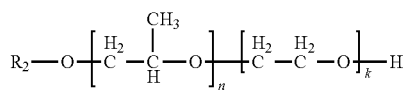

In Chemical formula XIV, $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation: $3 \leq n+k \leq 14$.

6. The ink according to any one of 1 to 5 mentioned above, wherein the polyether-modified siloxane compound is at least one member selected from the group consisting of the compounds represented by the following Chemical formula III and the aliphatic alcohol alkylene oxide compound is at least one member selected from the group consisting of compounds represented by the following Chemical formula IV.

Chemical formula III

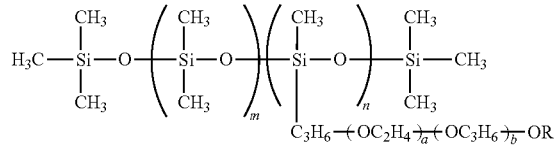

In Chemical formula III, m represents 0 or an integer of from 1 to 23 and n represents an integer of from 1 to 10, a represents an integer of from 1 to 23 and b represents 0 or an integer of from 1 to 23, and R represents a hydrogen atom or an alkyl group having 1 to 4 carbon atoms.

Chemical formula IV

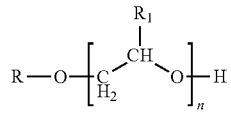

In Chemical formula IV, R represents an alkyl group having 8 to 13 carbon atoms, $R_1$ represents a hydrogen atom or a methyl group, and n represents an integer of from 2 to 12, 7. The ink according to any one of 1 to 6 mentioned above further contains at least one kind of organic solvent having a solubility parameter of from 8.96 to 11.79.

8. The ink according to 7 mentioned above, wherein the organic solvent having a solubility parameter of from 8.96 to 11.79 is at least one member selected from the group consisting of the compounds represented by the following Chemical formula I or the group consisting of the following Chemical formula II.

Chemical Formula I

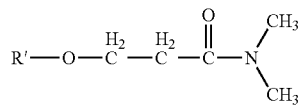

In Chemical formula I, R' represents an alkyl group having 4 to 6 carbon atoms,

Chemical formula II

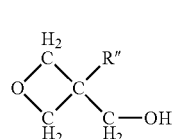

In Chemical formula II, R" represents an alkyl group having one or two carbon atoms.

9. The ink according to 7 or 8 mentioned above, wherein the organic solvent contains no polyhydric alcohol having an equilibrium moisture content of 30 percent or more at 23 degrees C. and a relative humidity of 80 percent.

10. The ink according to any one of 1 to 9 mentioned above, wherein the mass ratio (the polyether-modified siloxane compound/the aliphatic alcohol alkylene oxide compound) of the polyether-modified siloxane compound to the aliphatic alcohol alkylene oxide compound is from 10/90 to 50/50.

11. The ink according to any one of 1 to 10 mentioned above, wherein the polyether-modified siloxane compound accounts for 0.01 to 2 percent by mass of the ink.

12. The ink according to any one of 1 to 11 mentioned above further contains at least one member selected from the group consisting of the compound represented by the following Chemical formula V.

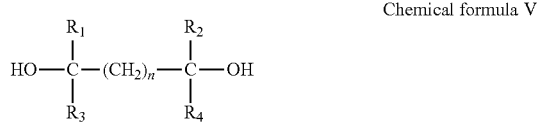

Chemical formula V

In Chemical formula V, $R_1$ and $R_2$ each, independently represent alkyl groups having 3 to 6 carbon atoms, $R_3$ and $R_4$ each, independently represent alkyl groups having one or two carbon atoms, and n represents an integer of from 1 to 6.

13. An ink set contains a yellow ink, a magenta ink, and a cyan ink, wherein each ink contains at least one kind of polyether-modified siloxane compound and at least one kind of aliphatic alcohol alkylene oxide compound.

14. The ink set according to 13 mentioned above, further contains a black ink containing at least one kind of polyether-modified siloxane compound and at least one kind of aliphatic alcohol alkylene oxide compound.

15. An ink container contains the ink of any one of claims 1 to 12.

16. An image forming method includes discharging the ink of any one of claims 1 to 12 to record an image.

17. An image forming apparatus includes the ink of any one of 1 to 12 mentioned above and a discharging device configured to discharge the ink to record an image.

The ink of any one of 1 to 12 mentioned above, the ink set of 13 or 14 mentioned above, the ink container of 15 mentioned above, the image forming method of 16 mentioned above, and the image forming apparatus of 17 mentioned above are to:

provide an ink having good image density and discharging stability to record quality images with reduced beading on general printing paper including plain paper.

In particular, along with improvement on wettability in an inkjet head, no foam is produced during filling the inkjet head with the ink, so that the ink is free of nozzle omission (non-ink discharging at nozzle) ascribable to foams.

Using the ink of the present disclosure, quality images can be recorded with reduced beading on general printing paper including plain paper. Also, the ink is good about initial filling property (wettability in liquid chamber and reduction on producing foams) of an inkjet head and contributes to good discharging stability and image density.

The ink preferably has a dynamic surface tension of 38 mN/m or less and more preferably 35 mN/m at a surface life of 15 msec at 25 degrees C. as measured by maximum bubble pressure technique. When the dynamic surface tension is 38 mN/m or less, coloring property and occurrence of voids on plain paper are improved. When the dynamic surface tension is 35 mN/m or less, wettability and permeation are improved on general printing paper, thereby reducing beading and color bleed.

Dynamic surface tension of the ink at a surface life of 15 msec according to maximum bubble pressure technique can be measured at 25 degrees C. by, for example, SITA_DynoTester (manufactured by SITA Messtechnik GmbH).

The static surface tension of the ink at 25 degrees C. is preferably 22 mN/m or greater and more preferably 24 mN/m or greater. When the static surface tension is 22 mN/m or greater, wetting on the nozzle plate repelling film of an inkjet head can be reduced and discharging stability is sufficiently secured. Therefore, nozzle omission can be reduced during decapping and continuous discharging. Moreover, when the static surface tension is 24 mN/m or greater, foaming of the ink during initial filling at an inkjet head is reduced, thereby enhancing initial filling property and initial discharging stability. Static surface tension of the ink can be measured at 25 degrees C. by using, for example, a fully-automatic surface tensiometer (CBVP-Z, manufactured by Kyowa Interface Science Co., Ltd.).

Due to this optimal balance between the dynamic surface tension and the static surface tension of the ink, initial filling property is improved, and the ink has excellent discharging stability during decapping and continuous discharging causing no nozzle omission. Moreover, quality images can be obtained on plain paper and general printing paper with the ink.

To prepare such an ink, it is suitable to use particular surfactants, which are at least one kind of polyether-modified siloxane compound and at least one kind of aliphatic alcohol alkylene oxide compound.

Ink

The ink of the present disclosure contains at least two kinds of surfactants. Inclusion of at least one kind of polyether-modified siloxane compound and at least one kind of aliphatic alcohol alkylene oxide compound strikes a balance between discharging stability and defoaming property.

In addition, due to at least one kind of polyether-modified siloxane compound and at least one kind of aliphatic alcohol alkylene oxide compound, wettability of the ink on recording media is sufficiently secured. Moreover, the ink can quickly permeate coated paper having a coated layer with poor ink absorption property such as general printing paper and thicken due to rapid pigment agglomeration in drying process after the ink lands on the paper, thereby reducing beading.

Surfactant

As one of the surfactants, a polyether-modified siloxane compound is used. In particular, the polyether-modified siloxane compound is preferably at least one member selected from the group consisting of the compounds represented by Chemical formula III.

Chemical formula III

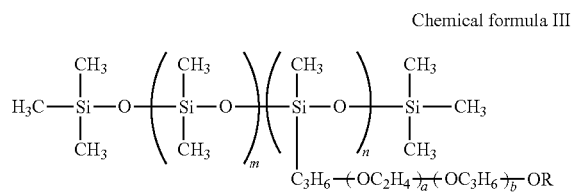

In Chemical formula III, m represents 0 or an integer of from 1 to 23 and n represents an integer of from 1 to 10, a represents an integer of from 1 to 23 and b represents 0 or an integer of from 1 to 23. R represents a hydrogen atom or an alkyl group having 1 to 4 carbon atoms, The compounds represented by the following Chemical formula VI to IX are more preferable.

Chemical formula VI

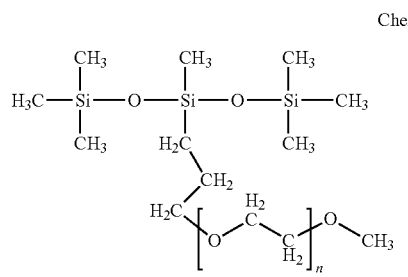

In Chemical formula VI, n represents an integer of from 2 to 17.

Chemical formula VII

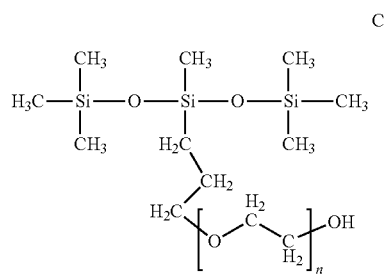

In Chemical formula VII, n represents an integer of from 2 to 17

Chemical formula VIII

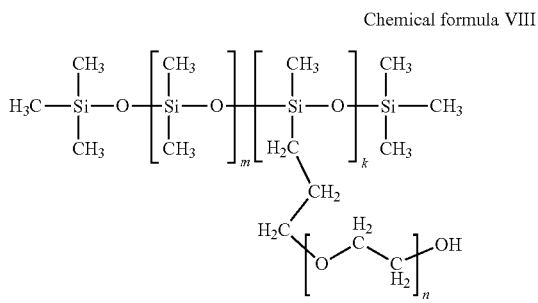

In Chemical formula VIII, k represents an integer of from 1 to 2, m represents 0 or an integer of from 1 to 5, and n represents an integer of from 3 to 17, Chemical formula IX

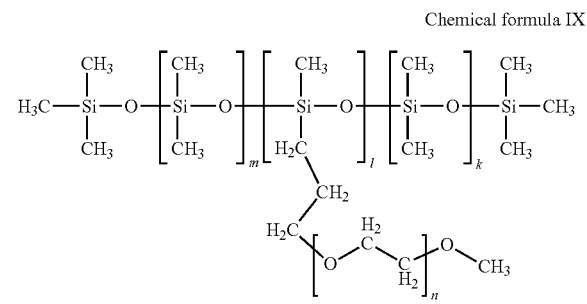

In Chemical formula IX, k+m represents 0 or an integer of from 1 to 7, l represents an integer of from 1 to 2, and n represents an integer of from 2 to 16.

Inclusion of the polyether-modified siloxane compound as the surfactant makes ink not easy to be wet on the ink repelling film of the nozzle plate of an ink head. Therefore, defective discharging caused by ink attachment to the nozzle can be prevented so that discharging stability is improved. In addition, quality images can be recorded with reduced beading on general printing paper including plain paper.

The polyether-modified siloxane compound excluding the compound represented by Chemical formula III is represented by, for example, any one of Chemical formulae X to XII in terms of keeping dispersion stability, low dynamic surface tension, permeability, and leveling property irrespective of the combination of the kind of coloring material and the organic solvents.

Chemical formula X

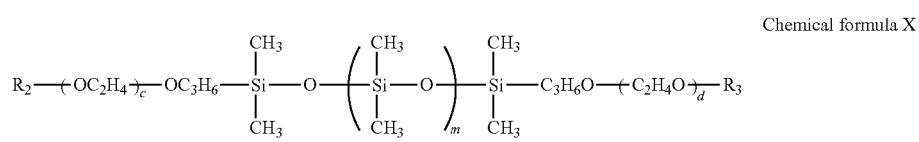

In Chemical formula X, m represents an integer of from 1 to 8 and c and d each, independently represent integers of from 1 to 10. $R_2$ and $R_3$ each, independently represent hydrogen atoms or alkyl groups having 1 to 4 carbon atoms.

Chemical formula XI

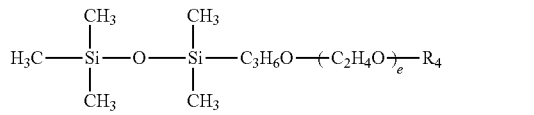

In Chemical formula XI, e represents an integer of from 1 to 8 and $R_4$ represents a hydrogen atom or an alkyl group having 1 to 4 carbon atoms.

Chemical formula XII

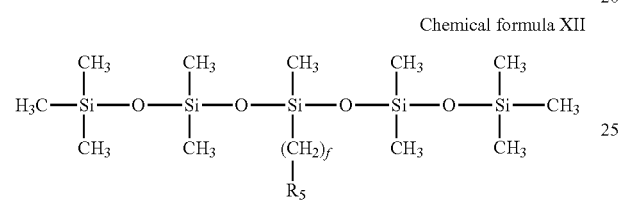

In Chemical formula XII, f represents an integer of from 1 to 8. $R_5$ represents a polyether group represented by the following chemical formula A.

Chemical formula A

In Chemical formula A, g represents 0 or an integer of from 1 to 23 and h represents 0 or an integer of from 1 to 23, excluding the case in which g and h are 0 at the same time. $R_6$ represents a hydrogen atom or an alkyl group having 1 to 4 carbon atoms.

Specific examples of the polyether-modified siloxane compound represented by Chemical formula III include, but are not limited to, the compounds represented by any one of the following Chemical structures VI to XIII.

Chemical structure VI

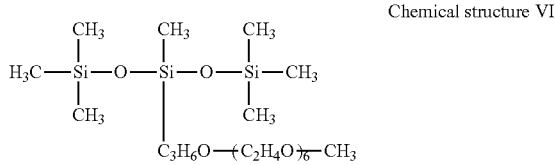

Chemical structure VII

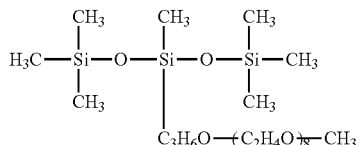

Chemical structure VIII

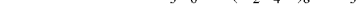

Chemical structure IX

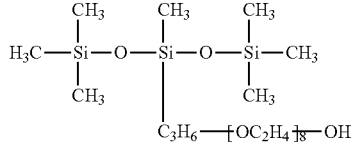

Chemical structure X

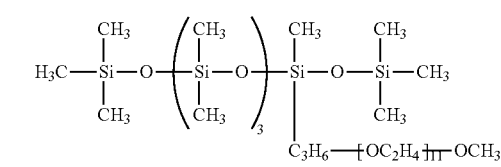

Chemical structure XI

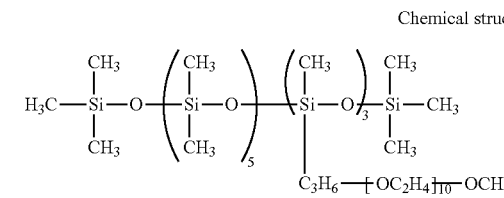

Chemical structure XII

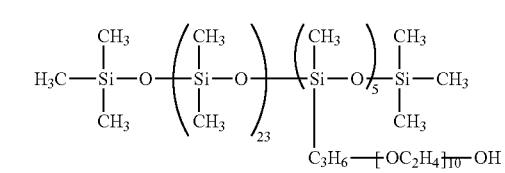

Chemical structure XIII

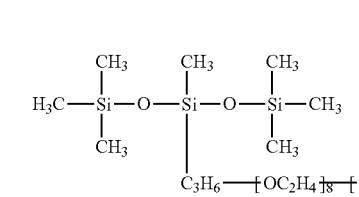

Specific examples of the polyether-modified siloxane compound represented by Chemical formula X include, but are not limited to, the compounds represented by the following Chemical structure XIV.

Chemical structure XIV

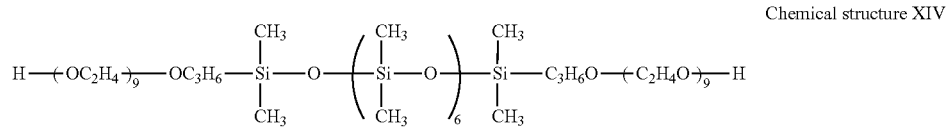

Specific examples of the polyether-modified siloxane compound represented by Chemical formula XI include, but are not limited to, the compounds represented by the following Chemical structure XV.

Chemical structure XV

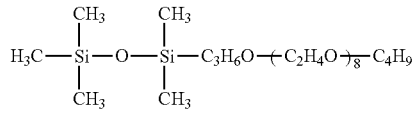

Specific examples of the polyether-modified siloxane compound represented by the Chemical formula XII include, but are not limited to, the compounds represented by the following Chemical structures XVI to XVIII.

Chemical structure XVI

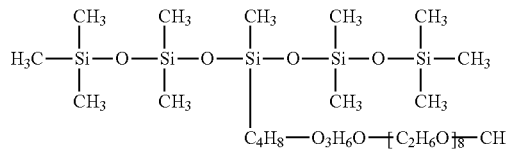

Chemical structure XVII

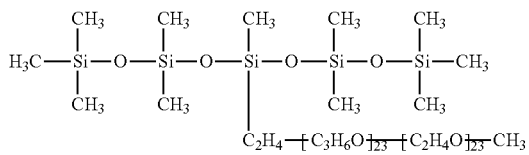

Chemical structure XVIII

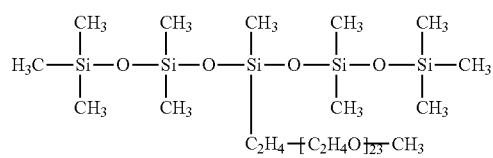

Any suitably synthesized polyether-modified siloxane compound and also products available on the market are usable.

The synthesis method of the polyether-modified siloxane compound has no particular limit and can be suitably selected to suit to a particular application. Examples are shown in JP-5101598-B, JP-5032325-B, and JP-5661229-B.

Specifically, the polyether-modified siloxane compound can be obtained by hydrosilylation reaction of (A) polyeter and (B) organohydrogen siloxane.

The polyether as the component (A) represents polyoxyalkylene copolymers represented by the formula $—(C_nH_{2n}O)—$, where n represents 2 to 4.

The polyoxyalikylene copolymer unit preferably includes oxyethylene unit $—(C_2H_4O)—$, oxypropylene unit $—(C_3H_6O)—$, oxybutylene unit $—(C_4H_8O)—$, or the mixture unit thereof. The oxyalkylene unit can be disposed in any, manner and form a block or random copolymer structure. Of the two, the random copolymer structure is preferable. More preferably, polyoxyalikylene contains both oxyethylene unit $—(C_2H_4O)—$ and oxypropylene unit $—(C_3H_6O)—$ in a random copolymer.

Organohydrogen siloxane as the component (B) contains organopolysiloxane including at least one hydrogen bonded with silicon (SiH) in one molecule. Examples of the organopolysiloxane are any arbitrary numbers or combinations of $(R_3SiO_{0.5})$, $(R_2SiO)$, $(RSiO_{1.5})$, and $(SiO_2)$, where R independently represents an organic group or a hydrocarbon group.

When R in $(R_3SiO_{0.5})$, $(R_2SiO)$, and $(RSiO_{1.5})$ of the organopolysiloxane is a methyl group, the siloxy unit is represented as M, D, and T unit. $(SiO_2)$ siloxy unit is represented as Q unit. The organohydrogen siloxane has a similar structure and at least one SiH present on the siloxy unit.

The methyl-based siloxy unit in the organohydrogen siloxane include "$M^H$" siloxy unit $(R_2HSiO_{0.5})$, "$D^H$" siloxy unit (RHSiO), and "$T^H$" siloxy unit $(HSiO_{1.5})$.

The organohydrogen siloxane may include any number of M, $M^H$, D, $D^H$, T, $T^H$, or Q siloxy unit under the condition that at least one siloxy unit includes SiH.

The component (A) and the component (B) are caused to react in hydrosilylation reaction. There is no specific limitation to the hydrosilylation reaction and it can be suitably selected to suit to a particular application. Addition of a hydrosilylation catalyst is preferable to conduct the hydrosilylation reaction.

There is no specific limitation to the hydrosilylation catalyst and can be suitably selected to suit to a particular application. Specific examples include, but are not limited to, platinum, rhodium, ruthenium, palladium, osmium, or iridium metal, organic metal compounds thereof, and combinations thereof.

The content of the hydrosilylation catalyst is preferably from 0.1 to 1,000 ppm and more preferably from 1 to 100 ppm based on the mass of the component (A) and the component (B).

The hydrosililation reaction can be conducted without dilution or under the presence of a solvent. It is preferable under the presence of a solvent.

Specific examples of the solvent include, but are not limited to, alcohols (for example, methanol, ethanol, isopropanol, butanol, and n-propanol), ketones (for example, acetone, methylethyl ketone, and methyl isobutyl ketone), aromatic hydrocarbons (for example, benzene, toluene, and xylene), aliphatic hydrocarbons (for example, heptane, hexane, and octane), glycol ethers (for example, propylene glycol methylether, dipropylene glycol methylether, propylene glycol n-propylether, and ethylene glycol n-butylether), halogenized hydrocarbon (for example, dichloromethane, 1,1,1-trichloroethane, methylene chloride, and chloroform), dimethylsulfoxide, dimethyl fromamide, acetonitrile, tetrahydrofuran, benzine, mineral spirit, and naphtha.

These can be used alone or in combination.

The content of the component (A) and the component (B) for use in the hydrosilylation reaction has no particular limit and can be suitably adjusted to suit to a particular application. It is represented in the molar ratio of the content of all of the unsaturated groups in the component (A) and the content of SiH of the component (B). It is preferable to use an amount of 20 mol percent or less polyether unsaturated groups to the SiH mol amount of organohydrogen siloxane. It is more preferable to use an amount of 10 mol percent or less polyether unsaturated groups. There is no specific limitation to the hydosilylation reaction and it can be conducted by any known batch method, semi-continuation method, or continuation method. For example, it is possible to conduct the reaction using a plug flow reactor.

Specific examples of polyether-modified siloxane compounds available on the market include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE SAG503A, SILFACE SAG008, and SILFACE SJM003, all manufactured by Nisshin Chemical Co., Ltd., TEGO Wet KL245, TEGO Wet 250, TEGO Wet 260, TEGO Wet 265, TEGO Wet 270, and TEGO Wet 280, all manufactured by Evonik Industries AG, and BYK-345, BYK-347, BYK-348, BYK-375, and BYK-377, all manufactured by BYK Japan KK. These can be used alone or in combination.

Of these, TEGO Wet 270 (manufactured by Evonik Industries AG) and SILFACE SAG503A (manufactured by Nisshin Chemical Co., Ltd.) are preferable.

The other surfactant is preferably a member of the aliphatic alcohol alkylene oxide compound selected from the group consisting of the compounds represented by the following Chemical formula IV or the group consisting of the compounds represented by the following Chemical formula XIV.

Chemical formula IV

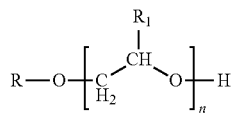

In Chemical formula IV, R represents an alkyl group having 8 to 13 carbon atoms, $R_1$ represents a hydrogen atom or a methyl group, and n represents an integer of from 2 to 12, Chemical formula XIV

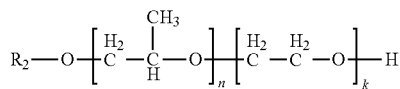

In Chemical formula XIV, $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation: $3 \leq n+k \leq 14$.

Inclusion of aliphatic alcohol alkylene oxide compound as the surfactant makes ink not easy to be wet on the ink repelling film of the nozzle plate of an ink head. Therefore, defective discharging caused by ink attachment to the nozzle can be prevented so that discharging stability is improved. Moreover, initial ink filling in the inkjet head is enhanced, thereby providing ideal ink having good discharging stability at the time of initial ink filling.

Specific examples of the aliphatic alcohol alkylene oxide compound represented by Chemical formula IV available on the market include, but are not limited to, Newcol NT-3, Newcol NT-S, and Newcol 1310 (manufactured by Nippon Nyukazai Co., Ltd.), and NOIGEN XL-40, NOIGEN XL-41, NOIGEN XL-50, NOIGEN LF-40X, NOIGEN LF-41X, NOIGEN LF-42X, NOIGEN LF-60X, NOIGEN TDS-50, NOIGEN TDS-70, NOIGEN TDX-50, NOIGEN SD-30, DKS NL-30, DKS NL-40, NOIGEN ET-65, DKS NL-Dash403, DKS NL-Dash404, NOIGEN LP-55, NOIGEN ET-106A, NOIGEN ET-69, and NOIGEN ET-89 (all manufactured by DKS Co. Ltd.).

Next, the aliphatic alcohol alkylene oxide compound represented by Chemical formula XIV is described.

Synthesis Examples of the compound represented by Chemical formula XIV are as follows.

Synthesis Example 1

Synthesis of Adduct (A-1) of 2-Ethyl-1-Hexanol with 4 Mols of EO 130 parts (1 part by mol) of 2-ethyl-1-hexanol and 1 part (0.002 parts by mol) of perchloric acid aluminum nonahydrate are loaded in a pressure tight reaction container equipped with a stirrer, heating-cooling equipment, and a dripping bomb. Subsequent to nitrogen replacement, the pressure tight reaction container is sealed, heated to 70 degrees C., and dehydrated with a reduced pressure for one hour. The system is heated to 80 degrees C. 88 parts (2 parts by mol) of ethylene oxide (EO) is dripped to the reaction container in 10 hours in such a manner that the pressure is adjusted to keep not greater than 0.2 MPaG, followed by aging at 95 degrees C. for five hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (a-1) of 2-ethyl-1-hexanol with 2 mols of EQ. 0.1 parts of potassium hydroxide is added to the thus-obtained (a-1) and the system is heated to 70 degrees C. followed by dehydration with a reduced pressure for one hour. The system is heated to 140 degrees C. 88 parts (2 parts by mol) of ethylene oxide (EO) is dripped to the reaction container in 3 hours in such a manner that the pressure is adjusted to keep not greater than 0.5 MPaG, followed by aging at 140 degrees C. for two hours.

After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (A-1) of 2-ethyl-1-hexanol with 4 mols of EO.

(A-1) is represented by Chemical formula XIV in which $R_2$ is 2-ethyl-1-hexyl group and the number of alkylene oxide m (=the number of the propylene oxide and ethylene oxide) is 4. The amount of non-reacted alcohol is measured using a gas chromatography under the following condition.

Type of device: Gas Chromatography GC-14B, manufactured by Shimadzu Corporation

Detector: FID   column: glass column (inner diameter=about 3 mm, length=about 2 m)

Column filling agent: silicon GE SE-30 5%

Column temperature: heat from 90 to 280 degrees C.

Heating speed: 4 degrees C./min

Carrier gas: nitrogen

Sample: 50 percent acetone solution

Infusing amount: 1 μl

Quantification: alcohol having carbon atoms by two to three less than alcohol used as inner reference material for quantification Synthesis Example 2

Synthesis of Adduct (A-2) of 2-ethyl-1-hexanol with 6 mols of EO 130 parts (1 part by mol) of 2-ethyl-1-hexanol and 1 part (0.002 parts by mol) of perchloric acid aluminum nonahydrate are charged in a pressure tight reaction container equipped with a stirrer, heating-cooling equipment, and a dripping bomb. Thereafter, the pressure tight reaction container is heated to 70 degrees C., and dehydrated under a reduced pressure for one hour. The system is heated to 80 degrees C. 88 parts (2 parts by mol) of ethylene oxide (EO) is dripped to the reaction container in 10 hours in such a manner that the pressure is adjusted to keep not greater than 0.2 MPaG, followed by aging at 95 degrees C. for five hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (a-2) of 2-ethyl-1-hexanol with 2 mols of EO. 0.2 parts of potassium hydroxide is added to the thus-obtained (a-2). Subsequent to nitrogen replacement, the system is sealed and heated to 70 degrees C. followed by dehydration under a reduced pressure for one hour. The system is heated to 140 degrees C. 176 parts (4 parts by mol) of ethylene oxide (EO) is dripped to the reaction container in 5 hours in such a manner that the pressure is adjusted to keep not greater than 0.5 MPaG followed by aging at 140 degrees C. for two hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (A-2) of 2-ethyl-1-hexanol with 6 mols of EO.

(A-2) is represented by Chemical formula XIV in which $R_2$ is 2-ethyl-1-hexyl group and the number of alkylene oxide m (=the number of the propylene oxide and ethylene oxide) is 6.

Synthesis Example 3

Synthesis of Adduct (A-3) of 3,5,5-trimethyl-1-hexanol with 4 mols of EO An adduct (A-3) of 3,5,5-trimethyl-1-hexanol with 4 mols of EO is obtained in the same manner as in Synthesis Example 1 except that 130 parts (1 part by mol) of 2-ethyl-1-hexanol is changed to 144 parts (1 part by mol) of 3,5,5-trimethyl-1-hexanol.

(A-3) is represented by Chemical formula XIV in which $R_2$ is 3,5,5-trimethyl-1-hexanol group and the number of alkylene oxide m (=the number of the propylene oxide and ethylene oxide) is 4.

Synthesis Example 4

Synthesis of Adduct (A-4) of 3,5,5-trimethyl-1-hexanol with 6 mols of EO An adduct (A-4) of 3,5,5-trimethyl-1-hexanol with 6 mols of DO is obtained in the same manner as in Synthesis Example 2 except that 130 parts (1 part by mol) of 2-ethyl-1-hexanol is changed to 144 parts (1 part by mol) of 3,5,5-trimethyl-1-hexanol.

(A-4) is represented by Chemical formula XIV in which $R_2$ is 3,5,5-trimethyl-1-hexanol group and the number of alkylene oxide m (=the number of the propylene oxide and ethylene oxide) is 6.

Synthesis Example 5

Synthesis of Adduct (A-5) of Decanol with 5 Mols of EO
An adduct (A-5) of decanol with 5 mols of EO is obtained in the same manner as in Synthesis Example 2 except that 130 parts (1 part by mol) of 2-ethyl-1-hexanol is changed to 158 parts (1 part by mol) (manufactured by KH Neochem. Co., Ltd.) and 176 parts of a) is changed to 132 parts (3 parts by mol).

(A-5) is represented by Chemical formula XIV in which $R_2$ is decyl group and the number of alkylene oxide m (=the number of the propylene oxide and ethylene oxide) is 5.

Synthesis Example 6

Synthesis of Random Adduct (A-6) of Decanol with 2 mols of EO (EO 5 mol/PO 1 mol) 158 parts (1 part by mol) of decanol and 1 part (0.004 parts by mol) of perchloric acid magnesium nonahydrate are charged in a pressure tight reaction container equipped with a stirrer, heating-cooling equipment, and a dripping bomb. Thereafter, the pressure tight reaction container is heated to 80 degrees C., and dehydrated under a reduced pressure for one hour. The system is heated to 95 degrees C. 88 parts (2 parts by mol) of ethylene oxide (EO) is dripped to the reaction container in 10 hours in such a manner that the pressure is adjusted to keep not greater than 0.2 MPaG followed by aging at 95 degrees C. for five hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (a-6) of decanol with 2 mols of EO. 0.5 parts of potassium hydroxide is added to the thus-obtained (a-6) and the system is heated to 95 degrees C. followed by dehydration under a reduced pressure for one hour. The system is heated to 140 degrees C. A mixture of 220 parts (5 parts by mol) and 58 parts (1 part by mol) of propylene oxide (PO) is dripped to the reaction container in 5 hours in such a manner that the pressure is adjusted to keep not greater than 0.5 MPaG, followed by aging at 140 degrees C. for two hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain a random adduct (A-6) of decanol with 2 mols of EO (EO 5 mol/PO 1 mol).

(A-6) is represented by Chemical formula XIV in which $R_2$ is decyl group and the number of alkylene oxide m (=the number of the propylene oxide and ethylene oxide) is 8.

Synthesis Example 7

Synthesis of Adduct (A-7) of 1-Nonanol with 6 Mols of EO
An adduct (A-7) of decanol with 6 mols of EO is obtained in the same manner as in Synthesis Example 2 except that 130 parts (1 part by mol) of 2-ethyl-1-hexanol is changed to 144 parts (1 part by mol) of 1-nonanol.

(A-7) is represented by Chemical formula XIV in which $R_2$ is n-nonyl group and the number of alkylene oxide m (=the number of the propylene oxide and ethylene oxide) is 6.

Synthesis Example 8

Synthesis of Adduct (A-8) of 3,5,5-trimethyl-1-hexanol with 4 mols of PO 144 parts (1 part by mol) of 3,5,5-trimethyl-1-hexanol and 0.5 parts (0.009 parts by mol) of potassium hydroxide are loaded in a pressure tight reaction container equipped with a stirrer, heating-cooling equipment, and a dripping bomb. Subsequent to nitrogen replacement, the pressure tight reaction container is sealed, heated to 70 degrees C., and dehydrated under a reduced pressure for one hour.

The system is heated to 130 degrees C. 232 parts (4 parts by mol) of propylene oxide (PO) is dripped to the reaction container in 10 hours in such a manner that the pressure is adjusted to keep not greater than 0.2 MPaG followed by aging at 140 degrees C. for five hours. After being cooing down to 70 degrees C., 10 parts of an adsorption treatment agent (Kyoward 600, manufactured by Kyowa Chemical Industry Co., Ltd.) is loaded in the reaction container. Subsequent to one-hour stirring at 70 degrees C., the adsorption treatment agent is filtrated to obtain an adduct (A-1) of 3,5-5-trimethyl-1-hexanol with 4 mols of PO.

(A-8) is represented by Chemical formula XIV in which $R_2$ is 3,5,5-trimethyl-1-hexanol group and the number of alkylene oxide m (=the number of the propylene oxide and ethylene oxide) is 4.

Synthesis Example 9

Synthesis of Adduct (A-9) of 3,5,5-trimethyl-1-hexanol with 3 mols of PO and 2 mols of EO 144 parts (1 part by mol) of 3,5,5-trimethyl-1-hexanol and 0.5 parts (0.009 parts by mol) of potassium hydroxide are loaded in a pressure tight reaction container equipped with a stirrer, heating-cooling equipment, and a dripping bomb. Subsequent to nitrogen replacement, the pressure tight reaction container is sealed, heated to 70 degrees C., and dehydrated under a reduced pressure for one hour.

The system is heated to 130 degrees C. 174 parts (3 parts by mol) of propylene oxide (PO) is dripped to the reaction container in 9 hours in such a manner that the pressure is adjusted to keep not greater than 0.2 MPaG followed by aging at 140 degrees C. for five hours. Thereafter, 88 parts (2 parts by mol) of ethylene oxide (EO) is dripped to the reaction container in 5 hours in such a manner that the pressure is adjusted to keep not greater than 0.5 MPaG followed by aging at 140 degrees C. for two hours. After being cooing down to 70 degrees C., 10 parts of an adsorption treatment agent (Kyoward 600, manufactured by Kyowa Chemical Industry Co., Ltd.) is loaded in the reaction container followed by one-hour stirring at 70 degrees C. Thereafter, the adsorption treatment agent is filtrated to obtain an adduct (A-9) of 3,5,5-trimethyl-1-hexanol with 3 mols of PO and 2 mols of EO.

(A-9) is represented by Chemical formula XIV in which $R_2$ is 3,5,5-trimethyl-1-hexanol group and the number of alkylene oxide m (=the number of the propylene oxide and ethylene oxide) is 5.

In the present disclosure, the ratio (polyether-modified siloxane compound/aliphatic alcohol alkylene oxide compound) of the polyether-modified siloxane compound to the aliphatic alcohol alkylene oxide compound as the surfactants is preferably from 1/99 to 50/50, more preferably from 10/90 to 50/50, and furthermore preferably from 20/80 to 40/60. Within the range of from 1/99 to 50/50, quality images can be recorded with reduced beading on general printing paper including plain paper. Also, the ink is good about initial filling property (wettability in liquid chamber and reduction of producing foaming) of an inkjet head and contributes to good discharging stability.

Since the ratio of the polyether-modified siloxane compound is 1 or greater, beading can be suitably reduced for general printing paper including plain paper. In addition, when the ratio of the polyether-modified siloxane compound is 50 or less, quality recording images are obtained. Also, initial filling property (wettability in liquid chamber, reduction of producing foams) of an inkjet head is enhanced, thereby sufficiently securing discharging stability.

In addition to the polyether-modified siloxane compound and the aliphatic alcohol alkylene oxide compound, fluorochemical surfactants, silicone-based surfactants, acetyleneglycol-based or acetylenealcohol-based surfactants can be used in combination.

The proportion of the surfactant to the entire ink is preferably from 0.001 to 5 percent by mass and more preferably from 0.5 to 3 percent by mass. When the proportion is from 0.001 to 5 percent by mass, ink is not easily wet on the ink repelling film of the nozzle plate of an ink head. Therefore, defective discharging caused by ink attachment to the nozzle plate can be prevented and discharging stability is improved.

Organic Solvent

In the present disclosure, the organic solvent generally means organic compounds functioning as solvents. For functionally described articles such as a wetting agent or a permeating agent, they are included in the organic solvent as long as they serve as solvents.

It is preferable to contain one or more organic solvents having a solubility parameter of from 8.96 to 11.79. Inclusion of the organic solvent having a solubility parameter of from 8.96 to 11.79 makes it possible to reduce occurrence of beading on general printing paper.

The solubility parameter (SP value) is a value indicating how easily both are mutually dissolved in each other. The SP value is represented by an attractive intermolecular force, that is, a square root of cohesive energy density (CED). CED is an amount of energy required to evaporate 1 mL, of an article.

The solubility parameter (SP value) is defined by the regular solution theory introduced by Hildebrand and indicates the solubility of a two-component system solution.

There are theories about the calculation method of SP value. In the present disclosure, a generally-used Fedors method is used.

According to Fedors method, the SP value can be calculated using the following relation B.

$$\text{SP value (solubility parameter)} = (\text{CED value})^{1/2} = (E/V)^{1/2} \quad \text{Relation B}$$

In Relation B, E represents molecule cohesive energy (cal/mol) and V represents molecular volume (cm$^3$/mol). Also, E and V are respectively represented by the following relation C and relation D, where Δei represents evaporation energy of atomic group and Δvi represents mole volume.

$$E = \Sigma \Delta ei \quad \text{Relation C}$$

$$V = \Sigma \Delta vi \quad \text{Relation D}$$

As the calculation method and the data of evaporation energy Δei and the mol volume Δvi of individual atomic groups, the data shown in Imoto, Minoru, *Basic Theory of Attachment*, chapter five, published by "KOUBUNSHI KAGAKUKAI" can be used.

In addition, regarding articles in which no —$CF_3$ group, etc., is shown, R. F. Fedors, Polymer Eng. Sci. 14, 147 (1974) can be referred to.

As the organic solvent having a solubility parameter (SP value) of from 8.96 to 11.79, at least one member selected from the group consisting of the amide compound represented by the following Chemical formula I and the oxetane compound represented by the following Chemical formula II is more preferable.

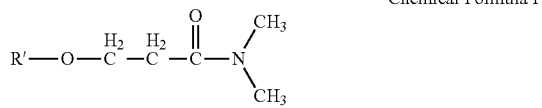

Chemical Formula I

In Chemical formula I, R' represents an alkyl group having 4 to 6 carbon atoms,

Chemical formula II

In Chemical formula II, R" represents an alkyl group having one or two carbon atoms.

Specific examples of the amide compound represented by Chemical formula I include, but are not limited to, the following compounds represented by Chemical structures I to III. Specific examples of the oxetane compound represented by Chemical formula II illustrated above include, but are not limited to, the following compounds represented by Chemical structures IV and V.

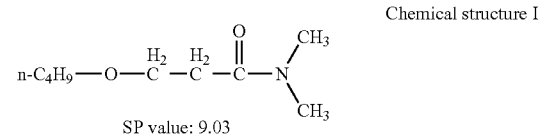

Chemical structure I

SP value: 9.03

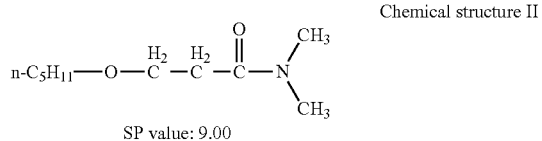

Chemical structure II

SP value: 9.00

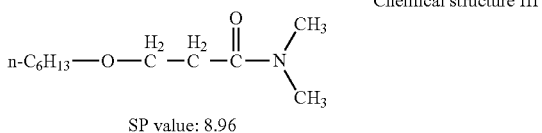

Chemical structure III

SP value: 8.96

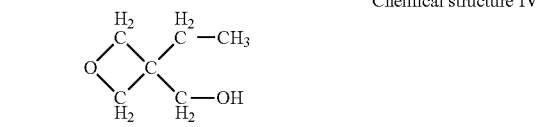

Chemical structure IV

SP value 11.3

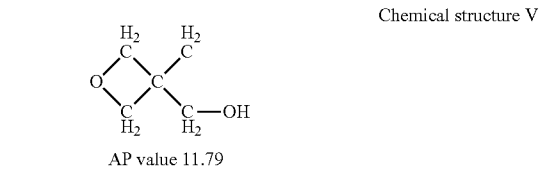

Chemical structure V

AP value 11.79

As the organic solvents, in addition to the amide compound represented by the Chemical formula I and the oxetane compound represented by the Chemical formula II, it is preferable to use polyhydric alcohols and permeating agents having a solubility parameter (SP value) of from 11.8 to 14.0.

Specific examples of the polyhydric alcohols having a solubility parameter (SP value) of from 11.8 to 14.0 include, but are not limited to, 3-methyl-1,3-butanediol (SP value: 12.05), 1,2-butane diol (SP value: 12.8), 1,3-butane diol (SP value: 12.75), 1,4-butane diol (SP value: 12.95), 2,3-butane diol (SP value: 12.55), 1,2-propane diol (SP value: 13.5), 1,3-propane diol (SP value: 13.72), 1,2-hexane diol (SP value: 11.8), 1,6-hexanendiol (SP value: 11.95), 3-methyl-L5-pentanediol (SP value: 11.8), triethyleneglycol (SP value: 12.12), and diethylenenglycol (SP value: 13.02). These can be used alone or in combination.

Of these, 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), 1,3-propanediol (SP value: 13.72) are preferable. 1,2-butanediol (SP value: 12.8) and 1,2-propanediol (SP value: 13.5) are more preferable.

The total of the polyhydric alcohol (polyol) having an solubility parameter (SP value) of from 11.8 to 14.0, the amide compound represented by the Chemical formula I, and the oxetane compound represented by Chemical formula II preferably accounts for 30 to 60 percent by mass of the total content of ink.

When the content is 30 percent by mass or greater, beading on general printing paper and color bleed between colors can be reduced. When the content is 60 percent by mass or less, image quality can be good and ink viscosity can be suitable, which makes discharging stability preferable.

As the permeating agent, the solubility parameter is preferably from 8.96 to 11.79. For example, polyol compounds and glycol ether compounds having 8 to 11 carbon atoms are suitable.

Of these, 1,3-diol compounds represented by Chemical formula XIII are preferable. Specific examples include, but are not limited to, 2-ethyl-1,3-hexane diol (SP Value: 10.6), 2,2,4-trimethyl-1,3-pentane diol (SP Value: 10.8), 2-ethyl-2-methyl-1,3-propane diol (SP Value: 11.65), 3,3-dimethyl-1,2-butane diol (SP Value: 11.49), 2,2-diethyl-1,3-propane diol (SP Value: 11.34), 2-methyl-2-propyl-1,3-propane diol (SP Value: 11.34), 2,4-dimethyl-2,4-pentanediol (SP Value: 11.05), 2,5-dimethyl-2,5-hexane diol (SP Value: 10.82), and 5-hexene-1,2-diol (SP Value: 11.80). Of these, 2-ethyl-1,3-hexane diol (SP Value: 10.6) and 2,2,4-trimethyl-1,3-pentane diol (SP Value: 10.8) are particularly preferable.

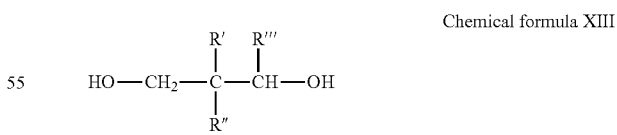

Chemical formula XIII

In Chemical formula XIII, R' represents a methyl group or an ethyl group, R" represents a hydrogen or a methyl group, and R'" represents an ethyl group or a propyl group.

Specific examples of the other polyol compound include, but are not limited to, 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The proportion of the permeating agent to the entire ink is preferably from 0.5 to 4 percent by mass and more preferably from 1 to 3 percent by mass. When the proportion is not less than 0.5 percent by mass, ink suitably permeates a medium, which has a good impact on the image quality. Conversely, when the content is 4 percent by mass or less, initial viscosity of ink becomes suitable.

The proportion of the organic solvent having a solubility parameter of from 8.96 to 11.79 to the entire ink is preferably 20 percent by mass or greater and more preferably from 20 to 60 percent by mass.

When the proportion is 20 percent by mass or more, beading on general printing paper is sufficiently reduced, thereby enhancing reduction effect on occurrence of color bleed between colors. When the proportion is not greater than 60 percent by mass, image quality is improved and ink viscosity becomes suitable, thereby stabilizing discharging.

The organic solvent preferably contains no polyhydric alcohol having an equilibrium moisture content of 30 percent or more at 23 degrees C. and a relative humidity of 80 percent. To obtain the equilibrium moisture content, a petri dish is preserved on which one gram of each organic solvent is placed in a desiccator in which the temperature and the relative humidity are respectively maintained at 22 to 24 degrees C. and 77 to 83 percent, using a saturated aqueous solution of potassium chloride and sodium chloride. The equilibrium moisture content is calculated utilizing the following relation:

Equilibrium moisture content (percent)=[moisture content absorbed in organic solvent/(amount of organic solvent+moisture content absorbed in organic solvent)]×100

If the organic solvent contains a polyhydric alcohol having an equilibrium moisture content of 30 percent or more at 23 degrees C. and an RH of 80 percent, ink does not easily permeate coated paper having a coated layer with poor ink absorption property such as general printing paper so that the ink slowly dries after the ink lands on the paper, which may cause beading.

Such a polyhydric alcohol having an equilibrium moisture content of 30 percent or more at 23 degrees C. and an RH of 80 percent is used in, for example, JP-2012-207202-A and JP-2014-94998-A.

Specific examples include, but are not limited to, 1,2,3-butanetriol (equilibrium moisture content: 38 percent), 1,2,4-butanetriol (equilibrium moisture content: 41 percent), glycerin (equilibrium moisture content: 49 percent, SP value: 16.38), diglycerin (equilibrium moisture content: 38 percent), triethylene glycol (equilibrium moisture content: 39 percent, SP value: 15.4), tetraethylene glycol (equilibrium moisture content: 37 percent), diethylene glycol (equilibrium moisture content: 43 percent), and 1,3-butane diol (equilibrium moisture content: 35 percent).

Coloring Material

It is preferable to use a water-dispersible pigment as the coloring material. Dyes can be used in combination for color tone adjustment. However, it should be used within a range having no adverse impact on weather resistance.

The pigments in the water-dispersible pigment are typified into organic pigments and inorganic pigments.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these, carbon black is preferable.

Carbon black (Pigment Black 7) can be manufactured by a known method such as a contact method, a furnace method, and a thermal method. Specific examples include, but are not limited to, channel black, furnace black, gas black, and lamp black.

Examples of carbon black available on the market are Black Pearls®, Elftex®, Monarch®, Regal®, Mogul®, and Vulcan®. Specific examples include, but are not limited to, Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Regal 400, Regal 660, and Vulcan P (all available from Cabot Corporation), SENSIJET Black SDP100 (available form SENSIENT), SENSIJET Black SDP 1000 (available from SENSIENT), and SENSIJET Black SDP 2000 (available from SENSIENT). These can be used alone or in combination.

Specific examples of the organic pigments include, but are not limited to, azo pigments, polycyclic pigments, dye chelate, nitro pigments, nitroso pigments, and aniline black. Of these, azo pigments and polycyclic pigments are preferable.

Specific examples of the azo pigments include, but are not limited to, azo lake, insoluble azo pigments, condensation azo pigments, and chelate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but are not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, 155, 180, 183, 185 and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

These can be used alone or in combination.

The specific surface area of the pigment has no particular limit and can be suitably selected to suit to a particular application. For example, the specific surface area is preferably from 10 to 1,500 $m^2/g$, more preferably from 20 to 600 $m^2/g$, and furthermore preferably from 50 to 300 $m^2/g$.

Unless a pigment having such a suitable surface area is available, it is possible to reduce the size of the pigment or pulverize it by using, for example, a ball mill, a jet mill, or ultrasonic wave for the pigment to obtain a relatively small particle diameter.

The volume particle diameter ($D_{50}$) of the pigment is preferably from 10 to 200 nm in ink.

As the water-dispersible pigment, for example, (1). A surfactant dispersion pigment in which a pigment is dispersed by a surfactant, (2). A resin dispersion pigment in which a pigment is dispersed by a resin, (3). A resin coated dispersion pigment in which the surface of a pigment is covered with a resin, and (4). A self-dispersible pigment in which a hydrophilic group is provided to the surface of a pigment are suitable.

Of these, in terms of storage stability over time and reduction of viscosity increase at the time of water evaporation, (3). A resin coated dispersion pigment in which the surface of a pigment is covered with a resin, and (4). A self-dispersible pigment in which a hydrophilic group is provided to the surface of a pigment are preferable.

As the self-dispersible pigment of (4) A self-dispersible pigment mentioned above, anionic-charged self-dispersible pigments are preferable.

Specific examples of the anionic functional groups include, but are not limited to, —COOM, —$SO_3$M, —$PO_3$HM, —$PO_3M_2$, —$CONM_2$, —$SO_3NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. Examples of the counter ion M are alkali metal ions and quaternary ammonium ion. Of these, quaternary ammonium ion is preferable.

Specific examples of the quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these, tetraethyl ammonium ion, tetrabutyl ammonium ion, and benzyl trimethyl ammonium ion are preferable. Of these, tetrabutyl ammonium ion is preferable.

If a self-dispersible pigment having the hydrophilic functional group or the quaternary ammonium ion is used, affinity is demonstrated in both water rich ink or organic solvent rich ink, so that dispersion stability of pigment can be inferentially maintained stable.

Of these self-dispersible pigments, since ink that uses a pigment modified by at least one of geminalbis phosphonic acid group and geminalbis phosphonic acid salt group has an excellent re-dispersibility after being dried, clogging does not occur even when the ink moisture around the inkjet head nozzles evaporates while the printing device is not operated for a long time. Therefore, good quality printing can be maintained by a simple cleaning operation.

Moreover, since such ink has good storage stability over time and can restrain viscosity increase during moisture evaporation, ink fixability and discharging reliability at a head maintaining device are extremely excellent.

Specific examples of phosphonic acid group and phosphonic acid salt group are represented by the following Chemical stricture i to Chemical structure iv.

Chemical structure i

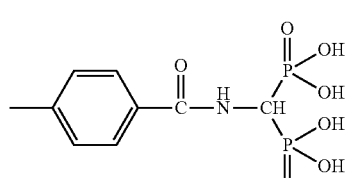

Chemical structure ii

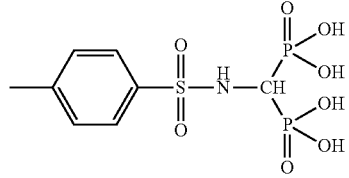

-continued

Chemical structure iii

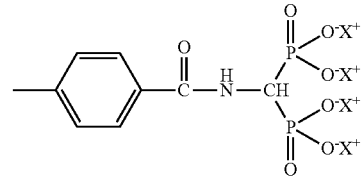

In Chemical structure iii, $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

Chemical structure iv

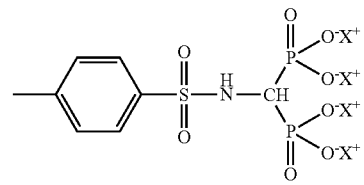

In Chemical structure iv, $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

Reforming Treatment of Surface of Pigment

Reforming treatment of the surface of a pigment is described taking a case of geminalbis phosphonic acid group as an example. For example, the pigment can be reformed by the following method A or method B.

Method A 20 g of carbon black, 20 mmol of the compound represented by Chemical structure v or Chemical structure vi illustrated below, and 200 mL of deionized water are mixed at room temperature by a Silverson Mixer (6,000 rpm). When an obtained slurry has a pH greater than 4, 20 mmol of nitric acid is added. 30 minutes later, 20 mmol of sodium nitrite dissolved in a minute amount of deionized highly pure water is slowly added to the mixture. Furthermore, when the resultant is stirred and heated to 60 degrees C. to react for one hour, a reformed pigment is obtained in which the compound represented by Chemical structure v or Chemical structure vi is added to carbon black. Thereafter, pH of the reformed pigment is adjusted to be 10 by NaOH aqueous solution. As a result, a reformed pigment dispersion is obtained 30 minutes later. Thereafter, subsequent to ultrafiltration by dialysis membrane using the reformed pigment dispersion and deionized water, the resultant is subject to ultrasonic wave dispersion to obtain a reformed pigment dispersion in which the solid portion is condensed.

Method B 500 g of dried carbon black, 1 L of water, and one mol of the compound represented by Chemical structure v or Chemical structure vi are loaded in a mixer (4 L) (ProcessAll 4 HV). Next, the mixture is vigorously mixed at 300 rpm for 10 minutes while keeping the system at 60 degrees C. Thereafter, 20 percent sodium nitrite aqueous solution (1 mol equivalent to the compound represented by chemical structure v or Chemical structure vi is added in 15 minutes followed by mixing and stirring for three hours while keeping the system at 60 degrees C. Thereafter, subsequent to withdrawal of the reactant while being diluted with 750 mL of deionized water, the resultant is subject to ultrafiltration by dialysis membrane using the thus-obtained reformed pigment dispersion and highly deionized water followed by ultrasonic wave dispersion to obtain a reformed pigment dispersion in which the solid portion is condensed. It is desirable to remove extra amount of coarse particles by a centrifugal, etc.

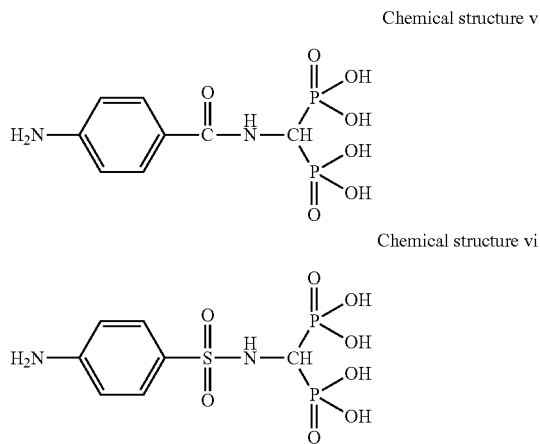

Chemical structure v

Chemical structure vi

Optionally, it is suitable to add a pH regulator to the thus-obtained reformed pigment dispersion. As the pH regulator, the same pH regulator as specified for the ink, which are described later, can be used. Of these, $Na^+$, $N(CH_3)_4^+$, $N(C_2H_5)_4^+$, $N(C_3H_7)_4^+$, and $N(C_4H_9)_4^+$ are preferable. Upon treatment by a pH regulator, the compound represented by Chemical structure v or Chemical structure vi is at least partially changed into a salt thereof (compound corresponding to a compound represented by Chemical structure iii or Chemical structure iv).

As the resin coated pigment in which the surface of the pigment of (3) mentioned above is coated with a resin, a polymer emulsion in which a pigment is contained in a polymer particle is preferable.

The polymer emulsion in which polymer particulates contain the pigment means an emulsion in which the pigments are encapsulated in the polymer particulates or adsorbed on the surface of the polymer particulates. In this case, it is not necessary that all the pigments are encapsulated or adsorbed and some of the pigments may be dispersed in the emulsion unless they have an adverse impact on the present disclosure.

Specific examples of the polymers (polymer in the polymer particulates) forming the polymer emulsions include, but are not limited to, vinyl-based polymers, polyester-based polymers, and polyurethane-based polymers. Of these, vinyl-based polymers and polyester-based polymers are particularly preferably used and the polymers specified in JP-2000-53897-A and JP-2001-139849-A are suitably used.

In this case, typical organic pigments or complex pigments in which inorganic pigment particles are coated with an organic pigment or carbon black can be used. The complex pigment can be manufactured by a method including precipitating organic pigments under the presence of inorganic pigments, a mechanochemical method including mechanically mixing and grinding inorganic pigments and organic pigments, etc.

Optionally, it is possible to provide an organosilane compound layer formed of polysiloxane and alkylsilane between inorganic pigments and organic pigments to improve attachability between them.

The organic pigment and the inorganic pigment have no particular limit and can be suitably selected from the mentioned above.

The mass ratio of the inorganic pigment particle and the organic pigment as coloring material or carbon black is preferably from 3:1 to 1:3 and more preferably from 3:2 to 1:2. When the ratio of the coloring material is small, coloring property may deteriorate. As the ratio of the coloring material increases, transparency and saturation may deteriorate.

Suitable specific examples of such coloring material particles in which the inorganic pigment particle is covered with the organic pigment or carbon black include, but are not limited to, silica/carbon black complex material, silica/phthalocyanine complex material (PB15:3), silica/disazo yellow complex material, and silica/quinacridone complex material (PR122) (all manufactured by TODAKOGYO CORP.) because these have small primary particle diameters. When inorganic pigment particles having a primary particle diameter of 20 nm are covered with an equivalent amount of organic pigments, the primary particle diameter of the pigment is about 25 nm. If a suitable dispersant is used to disperse the pigment to the degree of the primary particle diameter, it is possible to manufacture ultrafine pigment dispersion ink having a dispersion particle diameter of 25 nm.

With regard to the complex material, the organic pigment on the surface thereof contributes to dispersion. Also, since the feature of the inorganic pigment disposed in the center of the complex material demonstrates through the thin layer of the organic pigment having a thickness of about 2.5 nm, it is required to suitably select a pigment dispersant capable of stably dispersing both the organic pigment and the inorganic pigment at the same time.

The proportion of the coloring material to the entire ink is preferably from 1 to 15 percent by mass and more preferably 2 to 10 percent by mass. When the proportion is 1 percent by mass or greater, the coloring property of the ink and the image density are improved. When the proportion is not greater than 15 percent by mass, the ink does not thicken so that deterioration of discharging property can be prevented. It is also preferable in terms of economy.

Water

As the water, pure water rand and hyperpure water such as deionized water, ultrafiltered water, reverse osmosis water, and distilled water can be used.

The content of the water in the ink has no particular limit and can be selected to a particular application.

Other Components

The other components are not particularly limited and can be suitably selected to suit to a particularly application. For example, foam inhibitors (defoaming agent), water-dispersible resins, pH regulators, preservatives and fungicides, chelate reagents, corrosion inhibitors, anti-oxidants, ultraviolet absorbers, oxygen absorbers, and photostabilizing agents can be selected.

Foam Inhibitor (Defoaming Agent)

A minute amount of the foam inhibitor mentioned above is added to ink to prevent foaming in the ink. The foaming means that liquid forms a thin film enclosing air. The properties such as surface tension and viscosity of ink have impacts on formation of foams. That is, a force to make the surface area of liquid as least as possible is applied. Therefore, liquid such as water having a high surface tension never or little foams. Conversely, ink having a high viscosity and high permeation property tends to foam because the surface tension thereof is low so that the foam formed due to viscosity of the liquid is easily maintained and does not easily break.

Normally, such foam inhibitors locally lower the surface tension of foam film or foam inhibitors insoluble in a foaming liquid is dotted on the surface of the foaming agent to break the foam. If a polyether-modified siloxane compound capable of extremely reducing the surface tension is used as surfactant in the ink, a foam inhibitor having the former mechanism is used, it is not possible to locally reduce the surface tension of a foam film. Therefore, such foam inhibitors are not normally used. Therefore, the foam inhibitor insoluble in a foaming liquid is used instead. As a result, due to insolubility of the foam inhibitor in the solution, stability of the ink deteriorates.

Conversely, although the foam inhibitor represented by the following Chemical formula V is less able to reduce the surface tension than the polyether-modified siloxane compound, compatibility with the polyether-modified siloxane compound is better. Therefore, the foam inhibitor is efficiently taken in by the foam film, so that the surface of the foam film locally becomes an unequilibrium state due to the difference of the surface tension between the polyether-modified siloxane compound and the foam inhibitor, which leads to breakage of foams.

The compound represented by the following Chemical Structure V is used as the foam inhibitor.

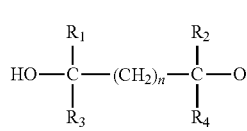

Chemical formula V

In Chemical formula V, $R_1$ and $R_2$ each, independently represent alkyl groups having 3 to 6 carbon atoms, $R_3$ and $R_4$ each independently represent alkyl groups having one or two carbon atoms, and n represents an integer of from 1 to 6.

Specific examples of the compound represented by Chemical formula V include, but are not limited to, 2,4,7,9-tetramethyldecane-4,7-diol and 2,5,8,11-tetramethyl dodecane-5,8-diol. Of these, considering reduction on foam production and compatibility with ink, 2,5,8,11-tetramethyldodecane-5,8-diol is preferable.

The proportion of the foam inhibitor to the entire ink is preferably from 0.01 to 10 percent by mass and more preferably 0.1 to 5 percent by mass. When the proportion is 0.01 percent by mass or greater, good defoaming property is obtained. When not greater than 10 percent by mass, good defoaming property is obtained so that ink properties such as viscosity and particle diameter become suitable.

Water-Dispersible Resin

The water-dispersible resin mentioned above has excellent film-forming (image forming) property, water repellency, water-resistance, and weather resistance. Therefore, these are suitable for image recording requiring good water-resistance and high image density (good coloring property).

Specific examples of the water-dispersible resins include, but are not limited to, condensation-based synthetic resins, addition-based synthetic resins, and natural polymers. These can be used alone or in combination.

Specific examples of the condensation-based synthetic resins include, but are not limited to, polyester resins, polyurethane resins, polyepoxy resins, polyamide resins, polyether resins, poly(meth)acrylic resins, acrylic-silicone resins, and fluorochemical resins.

Specific examples of the addition-based synthetic resins include, but are not limited to, polyolefin resins, polysty-rene-based resins, polyvinyl alcohol-based resins, polyvinyl ester-based resins, polyacrylic acid-based resins, and unsaturated carboxylic acid-based resins. Specific examples of the natural polymer include, but are not limited to, celluloses, rosins, and natural rubber.

Of these, fluorochemical resins and acrylic-silicone resins are preferable.

As the fluorochemical resin, a fluorochemical resin including fluoro-olefin units are preferable. Of these, a fluorochemical vinyl ether resin formed of fluoro-olefin units and vinyl ether units are more preferable.

There is no specific limitation to the fluoro-olefin unit and it can be suitably selected to suit to a particular application. Specific examples include, but are not limited to, —$CF_2CF_2$—, —$CF_2CF(CF_3)$—, and —$CF_2CFCl$—.

There is no specific limit to the vinylether units and it can be suitably selected to suit to a particular application. For example, the compounds represented by the following Chemical structures, etc., are suitable.

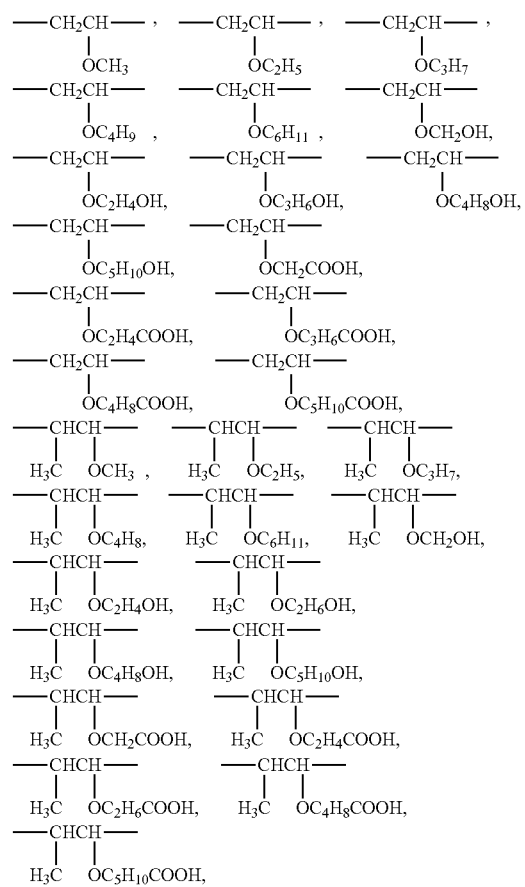

As the fluorochemical vinylether-based resin formed of the fluoroolefin unit and the vinyl ether unit, alternate copolymers in which the fluoro-olefin units and the vinyl ether units are alternately co-polymerized are preferable.

As the fluorochemical resin, any suitably synthesized fluorochemical resin and products available on the market can be used.

Specific examples of the products available on the market include, but are not limited to, FLUONATE FEM-500, FEM-600, DICGUARD F-52S, F-90, F-90M, F-90N, and AQUA FURAN TE-5A (all manufactured by DIC COPO- RATION); and LUMIFLON FE4300, FE4500, and FE4400, ASAHI GUARD AG-7105, AG-950, AG-7600, AG-7000, and AG-1100 (all manufactured by ASAHI GLASS CO., LTD.).

The water-dispersible resins can be used as homopolymers or copolymerized to be used as complex resins. Also, any of single phase structure type, core-shell type, and power feed type emulsions is suitable.

As the water-dispersible resin, water-dispersible resin that has a hydrophilic group with self-dispersiblity can be used. Alternatively, resins having no dispersibility but containing a surfactant or a resin having a hydrophilic group can be used. Of these, emulsions of resin particles obtained due to emulsification polymerization or suspension polymerization of ionomers or unsaturated monomers of a polyester resin or polyurethane resin are most suitable. In the case of emulsification polymerization of an unsaturated monomer, since a resin emulsion is obtained by reaction in water to which an unsaturated monomer, a polymerization initiator, a surfactant, a chain transfer agent, a chelate agent, a pH regulator, etc. are added, it is easy to obtain a water-dispersible resin and change the resin components. Since resin constitution can be easily changed, target properties can be easily obtained.

Specific examples of the unsaturated monomers include, but are not limited to, unsaturated carboxylic acids, monofunctional or poly-functional (meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon. These can be used alone or in combination. When these monomers are used in combination, the resin properties can be flexibly reformed. The resin properties can be reformed utilizing polymerization reaction and graft reaction using an oligomer type polymerization initiator.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hyxyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2-bis(4-methacryloxy diethoxyphenyl) propane, trimethylol propane trimethacrylate, trimethylol ethane trimethacrylate, polyethylene glycol diacrylate, triethylene glycol diacrylate, 1, 3-butylene glycol diacrylate, 1, 4-butylene glycol diacrylate, 1, 6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacryalte, tetramethylol methane tetraacrylate, pentaerythritol tetraacrylate, and dipentaerythritol hexaacrylate.

Specific examples of the (meth)acrylic amide monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group, Since breakage in molecule chains such as dispersion destruction and hydrolytic cleavage occurs to the water-dispersible resins in a strong alkali or strong acid environment, pH is preferably from 4 to 12, more preferably from 6 to 11, and furthermore preferably from 7 to 10 in terms of the miscibility with the water-dispersible coloring material.

The volume average particle diameter of the water-dispersible resin relates to the viscosity of a liquid dispersion. If the compositions are the same, the viscosity of the same solid portion increases as the particle diameter decreases. To avoid manufacturing ink having an excessively high viscosity, the volume average particle diameter of the water-dispersible resin is preferably 50 nm or greater.

In addition, particles having a particle diameter as large as several tens μm are larger than the size of the nozzle orifice of an inkjet head. Therefore, particles of that size is not suitable for use. When large particles smaller than the nozzle mouth are present in the ink, the discharging property of the ink deteriorates. The volume average particle diameter of the water-dispersible resin in the ink is preferably 200 nm or less and more preferably 150 nm or less in order not to degrade the ink discharging property.

In addition, it is preferable that the water-dispersible resin has a feature of fixing the coloring material on paper and forms a film at room temperature to enhance fixability of the coloring material. Therefore, the minimum film-forming temperature (MFT) of the water-dispersible resin is preferably 30 degrees C. or lower. In addition, when the glass transition temperature of the water-dispersible resin is −40 degrees C. or lower, viscosity of the resin film increases, thereby causing tackiness on obtained printed matter. Therefore, the glass transition temperature of the water-dipersible resin is preferably −30 degrees C. or higher. The proportion of the water-dispersible resin to the entire ink is preferably from 0.5 to 10 percent by mass and more from preferably 1 to 8 percent by mass in solid form.

pH Regulator

There is no specific limitation to the pH regulator capable of regulating pH of ink to be from 7 to 11 without having an adverse impact on the ink. It can be suitably selected to suit to a particular application. Specific examples include, but are not limited to, alcohol amines, hydroxides of alkali metal elements, ammonium hydroxides, phosphonium hydoxides, and carbonates of alkali metal elements. When the pH is in the range of from 7 to 11, there is not much dissolved inkjet head or ink supplying unit. Therefore, modification, leakage, poor discharging performance, etc. of the ink can be prevented.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide. Specific examples of the carbonates of alkali metal elements include, but are not limited to, lithium carbonate, sodium carbonate, and potassium carbonate.

Preservatives and Fungicides

Specific examples of the preservatives and fungicides include, but are not limited to, dehydrosodium acetate, sodium sorbinate, sodium 2-pyridine thiol-1-oxide, sodium benzoate, and pentachlorophenol sodium.

Chelate Reagent

Specific examples of the chelate reagents include, but are not limited to, ethylene diamine sodium tetraacetate, nitrilo sodium triacetate, hydroxyethylethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Wax

Polyethylene wax 1: AQUACER 531, melting point of 130 degrees C., manufactured by BYK Japan KK
Polyethylene wax 2: AQUACER 515, melting point of 135 degrees C., manufactured by BYK Japan KK
Polyethylene wax 3: AQUACER 3RC1452, melting point of 130 degrees C., manufactured by BYK Japan KK Before the addition of the wax, it is diluted with deionized water in such a manner that concentration of the solid portion is 30 percent by mass.

Method of Manufacturing Ink

The coloring material, the organic solvent, the surfactant, and the other optional components are dispersed or dissolved in water and thereafter stirred and mixed to manufacture the ink of the present disclosure. For stirring and mixing, devices such as a sand mill, a homogenizer, a ball mill, a paint shaker, an ultrasonic wave dispersing device, a stirrer having a stirring wing, a magnetic stirrer, a high performance, and dispersing device are used.

Ink Properties

Properties of the ink are not particularly limited and can be suitably selected to suit to a particular application. Preferably, viscosity, surface tension, etc., are in the following ranges. Viscosity of the ink is preferably from 5 to 25 mPa·S at 25 degrees C. More preferably, viscosity of the ink at 25 degrees C. is in the range of from 6 to 20 mPa·S. When the ink viscosity is 5 mPa·S or greater, printing density and text quality are enhanced. When the ink viscosity is 25 mPa·S or less, the ink discharging property is suitably secured. The viscosity can be measured by a viscometer (RE-550 L, manufactured by TOKI SANGYO CO., LTD.) at 25 degrees C.

The ink of the present disclosure can be suitably used for inkjet recording or spray painting. The ink for inkjet recording is used in any printer having an inkjet head such as a piezoelectric element type in which ink droplets are discharged by transforming a vibration plate forming the wall of the ink flowing path using a piezoelectric element as a pressure generating device to press the ink in the ink flowing path as described in JP-H2-51734-A; a thermal type in which bubbles are produced by heating ink in the ink flowing path with a heat element as described in JP-S61-59911-A; and an electrostatic type in which ink droplets are discharged by changes of the volume in the ink flowing path caused by transforming a vibration plate that forms the wall surface of the ink flowing path by a force of electrostatic generated between the vibration plate and the electrode while the vibration plate and the electrode are provided facing each other as described in JP-H6-71882-A.

Ink Set

It is preferable to constitute an ink set using the ink of the present disclosure.

All of yellow ink, magenta ink, and cyan ink constituting the ink set preferably contains at least one kind of each of polyether-modified siloxane compound and aliphatic alcohol alkylene oxide compound. Moreover, black ink preferably contains at least one kind of each of polyether-modified siloxane compound and aliphatic alcohol alkylene oxide compound. It is possible to maintain discharging stability of each color head nozzle without exception for initial recovery at the time of filling the head with the ink.

Ink Cartridge

The ink cartridge of the present disclosure accommodates the ink of the present disclosure in an ink container and other optional suitably-selected members.

There is no specific limit to the ink container. It is possible to select any form, any structure, any size, and any material to suit to a particular application. For example, an ink container including an ink bag (vessel) made of aluminum laminate film, plastic film, etc. can be suitably used.

Figure 2:
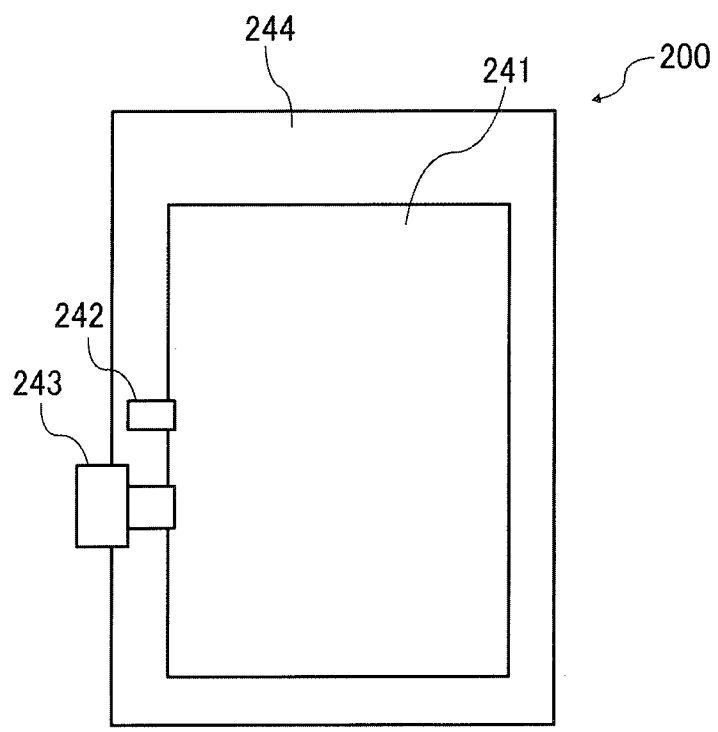
FIG. 2 is a schematic diagram illustrating an example of the ink container that accommodates the ink bag illustrated in FIG. 1 in a cartridge housing.

Next, the ink cartridge is described in detail with reference to FIGS. 1 and 2. FIG. 1 is a diagram illustrating an example of the ink cartridge. FIG. 2 is a diagram illustrating the ink cartridge illustrated in FIG. 1, including the housing thereof.

As illustrated in FIG. 1, in an ink cartridge 200, an ink bag 241 is filled with the ink for inkjet recording described above through an ink inlet 242. Subsequent to evacuation of air, the ink inlet 242 is closed by fusion. When in use, an ink outlet 243 made of rubber material is pierced by a needle installed onto an inkjet recording device to supply the ink into the device. The ink bag 241 is made of a packaging material such as aluminum laminate film having no air permeability. The ink bag 241 is normally accommodated in a cartridge housing 244 made of plastic as illustrated in FIG. 2 and detachably attachable to various image forming apparatus.

Image Forming Method and Image Forming Apparatus

The image forming method of the present disclosure includes an ink discharging process to record images and other suitably-selected optional processes.

The image forming apparatus of the present disclosure includes an ink discharging device to discharge the ink of the present disclosure to record images and other suitably-selected optional devices.

The image forming method of the present disclosure is executed by the image forming apparatus of the present disclosure and the ink discharging process is suitably conducted by the ink discharging device. In addition, the other processes are suitably conducted by the other corresponding devices.

Ink Discharging Process and Ink Discharging Device

The ink discharging process includes discharging the ink of the present disclosure to form images on recording media.

The ink discharging device discharges the ink of the present disclosure to form images on recording media. There is no specific limit to the ink discharging device. For example, various nozzles for ink discharging can be suitably used.

Energy for ink discharging is generated by, for example, a stimulus generating device. There is no specific limit to the selection of the stimuli. Heat (temperature), pressure, vibration, and light can be suitably selected to suit to a particular application. These can be used alone or in combination. Of these, heat and pressure are preferable.

Specific examples of the stimulus generating device include, but are not limited to, a heater, a pressurizing device, a piezoelectric element, a vibrator, an ultrasonic oscillator, and light. To be more specific, there are a piezoelectric actuator as the piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that utilizes an electrostatic force.

There is no specific limit to how the ink is jetted (discharged), which differs depending on the kind of the stimulus, etc. For example, in a case in which the stimulus is "heat", a method can be used in which thermal energy corresponding to recording signals is applied by, for example, a thermal head to produce foams in the ink and the ink is jetted and sprayed as liquid droplets from through orifices of nozzles of the recording head by the pressure of the foams. In addition, in a case in which the stimulus is "pressure", for example, a method can be used in which a voltage is applied to a piezoelectric element attached to the position referred to as a pressure chamber located in the ink flow path in a recording head to bend the piezoelectric element to contract the volume of the pressure chamber, thereby jetting and spraying the ink from the orifices of nozzles of the recording head as liquid droplets.

Other Processes and Other Devices

The other optional processes are not particularly limited and can be suitably selected to suit to a particular application. Examples are a drying process and a control process.

The other optional devices are not particularly limited and can be suitably selected to suit to a particular application. Examples are a drying device and a control device.

Drying Process and Drying Device

The drying process is to heat and dry a recording medium on which an image is recorded with the ink. The drying process is executed by a drying device.

The drying is not particularly limited and can be suitably selected to suit to a particular application. For example, the drying can be conducted by an infrared drier, a microwave drier, a roll heater, a drum heater, or heated air. Moreover, it is also suitable to include a fixing process of heating the surface of an image to smooth the surface and fix the image with a heater to 100 to 150 degrees C.

This fixing process improves gloss and fixability of image recorded matter. A roller, a drum heater, etc. having a heated mirror surface is preferably used as the heating and fixing device and the mirror surface (smoothing portion) is brought into contact with the image formed surface. Taking into account image quality, safety, and economy, a fixing roller heated to 100 to 150 degrees C. is preferable.

Control Process and Control Device

The control process mentioned above is to control each process and can be suitably conducted by the control device.

The control device (controller) has no particular limit as long as it can control the behavior of each device. It can be suitably selected to suit to a particular application. For example, devices such as a sequencer and a computer are preferable.

One embodiment of conducting the inkjet recording method of the present invention using the image forming apparatus of the present disclosure is described with reference to accompanying drawings.

Figure 3:
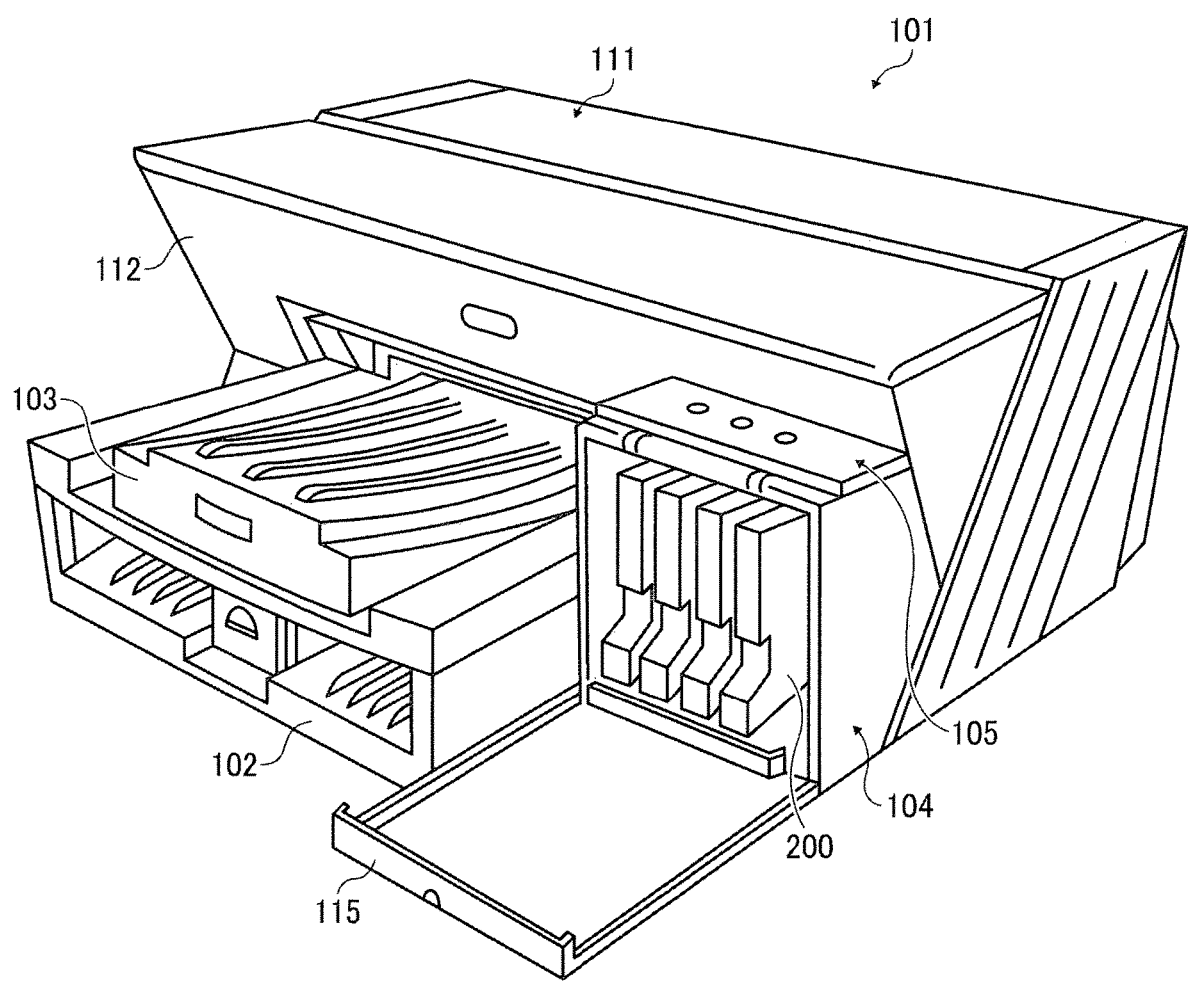
FIG. 3 is a diagram illustrating a perspective view of an example of the inkjet recording device according to an embodiment of the present invention in which the cover of the ink container installation unit is open.

An inkjet recording device 101 illustrated in FIG. 3 has a sheet feeder tray 102 to accommodate recording media placed therein, an ejection tray 103 installed in the inkjet recording device 101, which stores recording media on which images are recorded (formed), and an ink cartridge installation unit 104. Various recording media can be fed using this sheet feeder tray 102. The reference numerals 111 and 112 respectively represent a top cover and a front cover.

On the upper surface of the ink cartridge installation unit 104 is arranged an operation unit 105 including operation keys, a display, etc. The ink cartridge installation unit 104 includes an ink cartridge front cover 115 that is openable and closable to detach and attach the ink cartridge 200.

Figure 4:
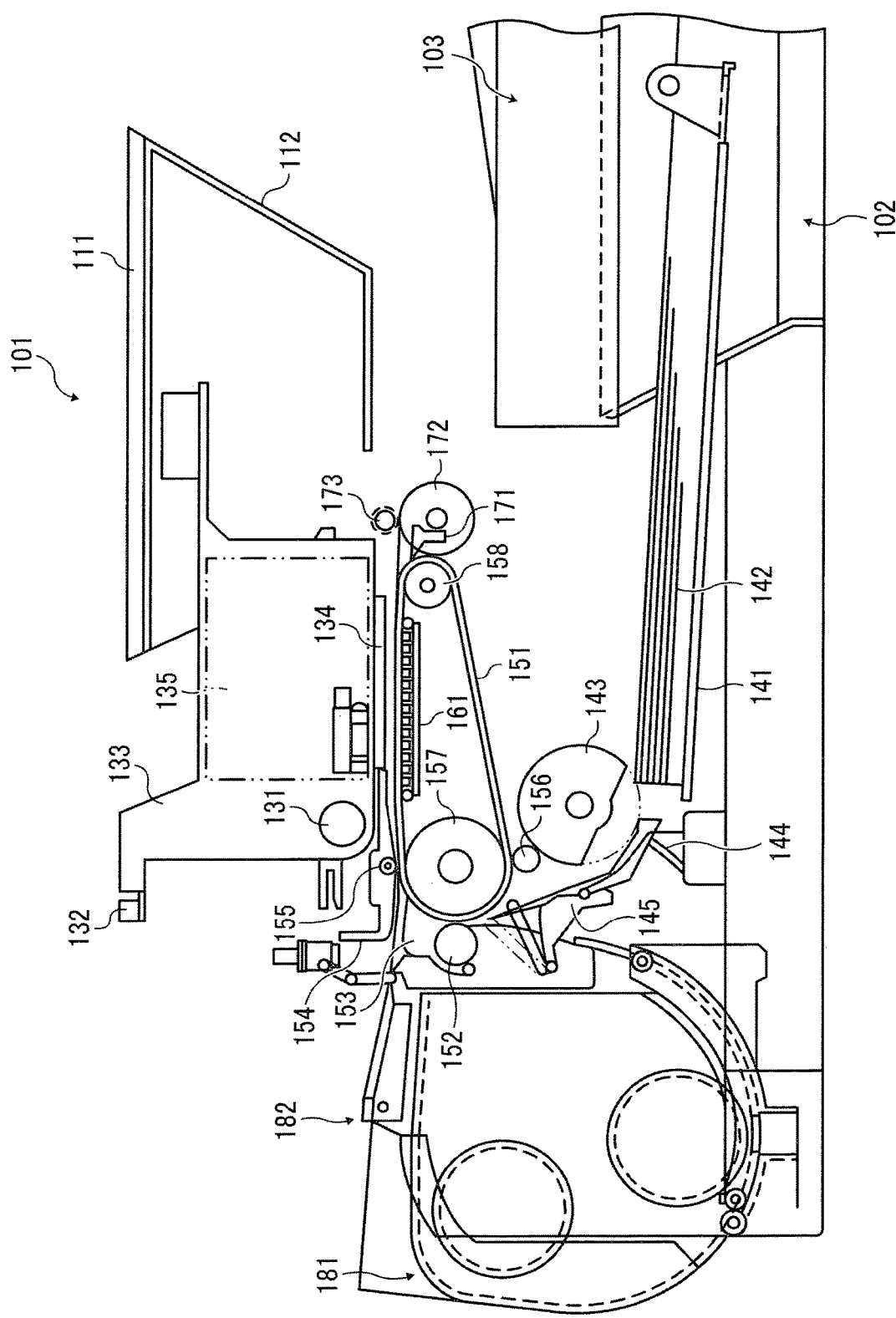
FIG. 4 is a schematic diagram illustrating the entire configuration of the inkjet recording device according to an embodiment of the present invention.
Figure 5:
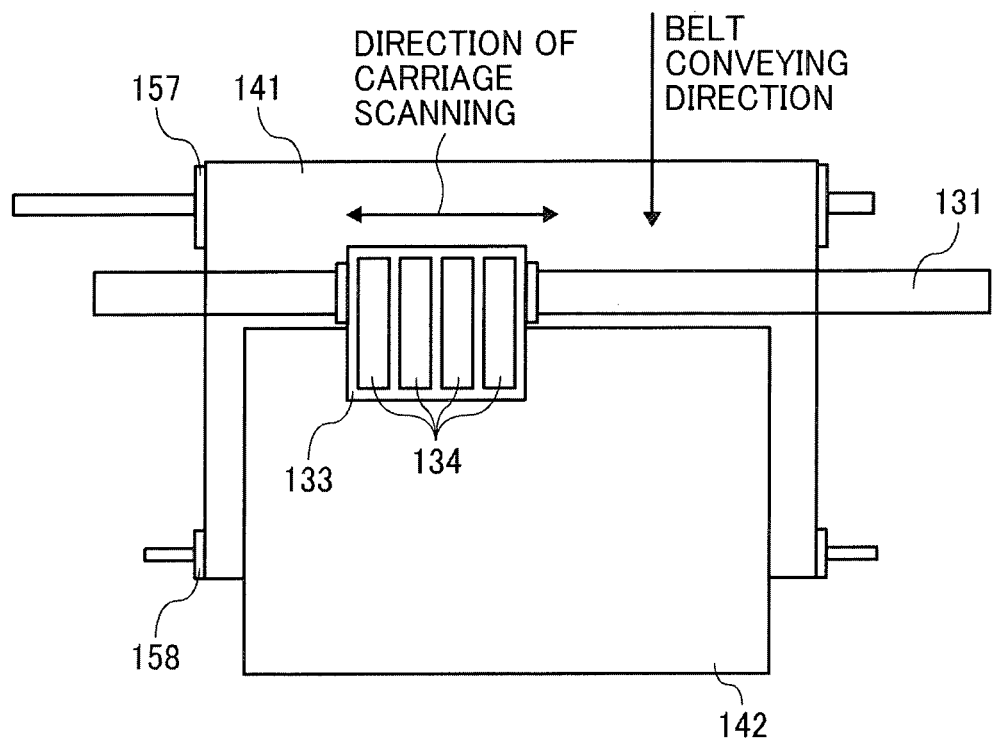
FIG. 5 is a diagram illustrating a partial enlarged cross section of the inkjet recording device illustrated in FIG. 3.

Inside the inkjet recording device 101, as illustrated in FIGS. 4 and 5, a guide rod 131 serving as a guiding member that laterally bridges side plates on the right hand side and left hand side and a stay 132 slidably hold a carriage 133 in the main scanning direction. A main scanning motor moves the carriage 133 in the direction indicated by the arrow in FIG. 5.

The carriage 133 has a recording head 134 including four inkjet recording heads that discharge ink droplets of each color of yellow (Y), cyan (C), magenta (M), and black (Bk) while multiple ink discharging orifices are arranged in the direction crossing the main scanning direction with the ink droplet discharging direction downward.

As the heads for inkjet recording that constitute the recording head 134, it is possible to use a device having an energy-generating device to discharge an ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 includes sub tanks 135 for colors to supply each color ink to the recording head 134. The ink is supplied and replenished to the sub-tank 135 via an ink supplying tube from the ink cartridge 200 mounted onto the ink cartridge installation unit 104.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while being biased towards the sheet feeding roller 143.

A conveyance unit to convey the sheet 142 fed from the sheet feeding unit below the recording head 134 includes a conveying belt 151 to electrostatically adsorb and convey the sheet 142, a counter roller 152 to convey the sheet 142 fed from the sheet feeding unit via a guide 145 while pinching the sheet 142 with the conveying belt 151, a conveying guide 153 to make the sheet 142 track on the transfer belt 151 by changing the conveying direction of the sheet 142 being sent substantially vertically upward by substantially 90 degrees, a front end pressure roller 155 biased towards the conveying belt 151 by a pressure member 154, and a charging roller 156 to charge the surface of the conveying belt 151.

The conveying belt 151 is an endless form belt, suspended between a conveying roller 157 and a tension roller 158 and rotatable in the belt conveying direction. This conveying belt 151 includes, for example, a top layer serving as a sheet adsorption surface made of a resin material such as a copolymer (ETFE) of tetrafluoroethylene and ethylene with no resistance treatment having a thickness of about 40 µm, and a bottom layer (moderate resistance layer, earth layer) made of the same material as the top layer with resistance treatment with carbon.

On the rear side of the conveying belt 151, a guiding member 161 is disposed corresponding to the print area by the recording head 134. An ejection unit to eject the sheet 142 on which images are recorded by the recording head 134 includes a separation claw 171 to separate the sheet 142 from the conveying belt 151, an ejection roller 172, and an ejection roller 173. An ejection tray 103 is arranged below the ejection roller 172.

A duplex printing sheet feeding unit 181 is mounted in a detachable and attachable manner to the rear side of the inkjet recording device 101.

The duplex printing sheet feeding unit 181 takes in and reverses the sheet 142 that is returned by the reverse rotation of the conveying belt 151 and feeds it again between the counter roller 152 and the conveying belt 151. A bypass sheet feeding unit 182 is provided on the upper surface of the duplex printing sheet feeding unit 181

In this image forming apparatus (inkjet recording device), the sheet 142 is separated and fed from the sheet feeding unit one by one substantially vertically upward, guided by the guide 145, and conveyed while being pinched between the conveying belt 151 and the counter roller 152. Furthermore, the front end of the substrate 142 is guided by the conveying guide 153 and pressed against the transfer belt 151 by the front end pressure roller 155 to change the conveying direction substantially 90 degrees.

Since the conveying belt 151 is charged by the charging roller 156 at this point, the sheet 142 is electrostatically adsorbed to the conveying belt 151 and transferred. Due to drive of the recording head 134 in response to the image signal while moving the carriage 133, the ink droplet is discharged to the sheet 142 not in motion to record an image in an amount of one line and thereafter the sheet 142 is conveyed in a predetermined amount to be ready for the recording for the next line. On receiving a signal indicating that the recording has completed or the rear end of the sheet 142 has reached the image recording area, the recording operation stops and the sheet 142 is ejected to the ejection tray 103.

When the amount of ink remaining in the sub-tank 135 approaching to empty is detected, a predetermined amount of the ink is replenished to the sub tank 135 from the ink cartridge 200.

In this inkjet recording device, it is possible to dissemble the chassis of the ink cartridge 200 and replace only the ink bag therein when the ink is used up in the ink cartridge 200. In addition, the ink cartridge 200 stably supplies the ink even when the ink cartridge 200 is placed on its side and installed by front loading. Therefore, even when the upside of the inkjet recording device 101 is blocked, for example, it is placed in a rack or something is placed on the upper surface of the inkjet recording device 101, the ink cartridge 200 can be easily exchanged.

A serial type (shuttle type) in which the carriage scans is used in this description but this is true in a line-type image recording device having a line type head.

In addition, the image forming apparatus and the image forming method of the present disclosure are suitably applicable to, in particular, recording systems employing inkjet recording such as printers for inkjet recording, facsimile machines, photocopiers, multi-functional machines (printer/facsimile/photocopier).

Image Formed Matter

The image formed matter of the present disclosure is configured by a recording medium on which an image is formed using the ink of the present disclosure.

Recording Medium

There is no specific limitation to the recording medium and it can be suitably selected to suit to a particular application. For example, plain paper, gloss paper, special paper, cloth, film, transparent sheets, general printing paper, etc. are suitable.

The image formed matter is of high quality image without blur and excellent in stability over time so that it can be suitably used for various purposes as references, etc., on which images, etc. are recorded.

Of these, in terms of recording images having high quality (image density, saturation, beading, color bleed) and high gloss with excellent smear fixability, general printing paper having a liquid imbibition in a particular range is preferable. A specific example is a recording medium having a coated layer on at least one side thereof and the side having the coated layer preferably has a transfer amount of deionized water to the recording medium of from 2 to 35 ml/m$^2$ in a contact time of 100 ms and a transfer amount of deionized water to the recording medium of from 3 to 40 ml/m$^2$ in a contact time of 400 ms as measured by a dynamic scanning absorptometer (DSA).

When a recording medium having an excessively small transfer amount of deionized water is used, beading (a phenomenon in which adjacent dots attracted to each other make images feel rough) and color bleed (bleeding between colors) tend to occur even if the ink mentioned above is used. When a recording medium having an excessively large transfer amount of deionized water is used, the ink dot diameter after recording tends to become smaller than desired, so that solid images may not be filled with the ink.

This dynamic scanning absorptometer (DSA; Journal of JAPAN TAPPI, Vol. 48, p 88 to p 92, published in May 1994, authored by Kuga, Shigenori) can accurately measure the imibibition liquid amount in an extremely short time. Measuring utilizing this dynamic scanning absorptometer is automated according to the method of: (1) directly reading the absorption speed of liquid from the moving of meniscus in a capillary; and (2) spirally scanning a sample having a disc-like form with an imbibition head, while automatically changing the scanning speed according to predetermined patterns to measure the necessary number of points of this single sample. The liquid supply head to the paper sample is connected with the capillary via a TEFLON® tube and the position of the meniscus in the capillary is automatically read by an optical sensor. Specifically, the transfer amount of deionized water is measured using a dynamic scanning absorptometer (K350 Series D type, manufactured by Kyowa Seiko Inc.). Each of the transfer amount in the contact time of 100 ms can be obtained by interpolation of the measuring results of the transfer amount in the proximity contact time of the respective contact periods of time.

General printing paper having a liquid imbibition in a particular range is available on the market. Specific examples include, but are not limited to, POD gloss coat, OK TOP COAT+, OK KINFUJI+, and SA KINFUJI+(manufactured by Oji Paper Co., Ltd.), SUPER MI DUL, AURORA COAT, and SPACE DX (manufactured by Nippon Paper Industries Co., Ltd.), a matte and μ coat (manufactured by Hoketsu Paper Co., Ltd.), RAICHO ART and RAICHO SUPER ART (manufactured by Chuetsu Pulp & Paper Co., Ltd.), and PEARL COAT N (manufactured by Mitsubishi Paper Mills Limited).

Image forming, recording, printing, print, etc. in the present disclosure represent the same meaning.

Also, recording media, media, substrates in the present disclosure have the same meaning.

EXAMPLES

Next, the present disclosure is described in detail with reference to Examples but is not limited thereto.

Pigment Dispersion Covered with Water-Insoluble Vinyl Polymer

As the water-dispersible pigment, a pigment covered with a water-insoluble vinyl polymer is used. To obtain a water dispersion of this pigment, the water-insoluble vinyl polymer is dissolved in an organic solvent. The pigment, water, a neutralizing agent, and other optional surfactants are added to the solution. Subsequent to mixing and kneading, water is optionally added to dilute the resultant and the organic solvent is distilled away to make it aqueous.

Manufacturing Examples 1 to 6 of Water-Insoluble Vinyl Polymer 20 parts of methylethyl ketone, 0.03 parts of polymerization chain transfer agent (2-mercapto ethanol), and 10 percent by mass of each of monomers shown in Table 1 (represented in parts by mass) were mixed followed by sufficient nitrogen replacement to obtain a liquid mixture.

The rest (90 percent by mass) of each monomer (represented in parts by mass) shown in Table 1 was placed in a dripping funnel. Thereafter, 0.27 parts of a polymerization chain transfer agent (2-mercapto ethanol), 60 parts of methylethyl ketone, and 1.2 parts of 2,2'-azobis(2-4-dimethyl valeronitrile) were placed in the dripping funnel followed by mixing and sufficient nitrogen gas replacement to obtain a liquid mixture.

In nitrogen atmosphere, the liquid mixture in the reaction container was stirred and heated to 75 degrees C. The liquid mixture in the dripping funnel was slowly dripped to the reaction container in three hours. After the dripping, the liquid temperature of the thus-obtained liquid mixture was maintained at 75 degrees C. for two hours. Thereafter, a solution in which 0.3 parts of 2,2'azobis(2,4-dimethyl valeronitrile) was dissolved in 5 parts of methylethyl ketone was added to the thus-obtained liquid mixture followed by two-hour aging at 75 degrees C. and another two-hour aging at 85 degrees C. to obtain a polymer solution.

The thus-obtained polymer solution was partially dried at 105 degrees C. with a reduced pressure for two hours to remove the solvent for isolation. A mass average molecular mass was measured by gel permeation chromatography using polystyrene as the reference material and 60 mmol/L of phosphoric acid and 50 mmol/L of dimethyl formamide containing lithium bromide as solvents.

The details of each compound shown in Table 1 are as follows.

ethoxypolyethylene glycol monomethacrylate: a monomer in which n is 9, $R_1$ is a methyl group, $R_2$ is an ethylene group, and $R_3$ is an ethyl group in the following Chemical formula XV.

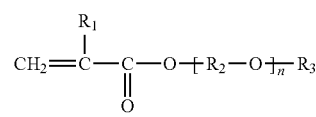

Chemical formula XV octoxy polyethylene glycol monommethacrylate: a monomer in which n is 6, $R_1$ is a methyl group, $R_2$ is an ethylene group, and $R_3$ is an octyl group in Chemical formula XV illustrated above.

octoxy polypropylene glycol polypropylene glycol monomethacrylate: a monomer in which is 6 (average number of adducts of mols of polyethylene glycol is 4, average number of adducts of mols of polypropylene glycol is), $R_1$ is a methyl group, $R_2$ is an ethylene group and a polypropylene group, and $R_3$ is an octyl group, and oxyethylene group and oxyethylene propylene group are randomly adducted in Chemical formula XV illustrated above.

lauroxy polyethylene glycol monomethacrylate: a monomer in which n is 4, $R_1$ is a methyl group, $R_2$ is an ethylene group, and $R_3$ is a dodecyl group in Chemical formula XV illustrated above.

stearoxy polyethylene glycol monomethacrylate: a monomer in which n is 9, $R_1$ is a methyl group, $R_2$ is an ethylene group, and $R_3$ is a octadecyl group in Chemical formula XV illustrated above.

polyethylene glycol monomethacrylate: a monomer in which n is 15, $R_1$ is a methyl group, $R_2$ is an ethylene group, and $R_3$ is a hydrogen atom in Chemical formula XV illustrated above, methacrylic acid: GE-110 (MMA), manufactured by MIT-SUBISHI GAS CHEMICAL COMPANY, INC.

methacrylic acid2-ethylhexy: "Akuri Ester EH", manufactured by Mitsubishi Rayon Co., Ltd.

styrene monomer: styrenemonomer, manufactured by NIPPON STEEL & SUMIKIN CHEMICAL CO., LTD.

styrenemacromer: AS-6S (styerene macromer), number average molecular weight of 6,000, manufactured by TOAGOSEI CO., LTD.

TABLE 1

| Monomer | Manufacturing Example | | | | | |
|---|---|---|---|---|---|---|
| | 1 | 2 | 3 | 4 | 5 | 6 |
| (A) Ethoxypolyethylene glycol monomethacrylate (n = 9) | 10 | 0 | 0 | 0 | 0 | 0 |
| Octoxypolyethylene glycol monomethacrylate (n = 6) | 0 | 10 | 0 | 0 | 0 | 0 |
| Octoxypolyethylene glycol polypropylene glycol monomethacrylate (n = 6) | 0 | 0 | 10 | 0 | 0 | 0 |
| Lauroxypolyethylene glycol monomethacrylate (n = 4) | 0 | 0 | 0 | 10 | 0 | 0 |
| Stearoxypolyethylene glycol monomethacrylate (n = 9) | 0 | 0 | 0 | 0 | 10 | 0 |
| polyethylene glycol monomethacrylate (n = 15) | 0 | 0 | 0 | 0 | 0 | 10 |
| (B) Methacrylic acid | 12 | 12 | 14 | 14 | 14 | 12 |
| (C) 2-Ethylhexyl methacrylate | 22 | 22 | 20 | 20 | 20 | 20 |
| Styrene monomer | 46 | 46 | 46 | 46 | 46 | 46 |
| Styrene macromer | 10 | 10 | 10 | 10 | 10 | 10 |
| Mass average molecular mass | 32000 | 41000 | 40000 | 30000 | 32000 | 40000 |
| Degree of neutralization (percent) | 90 | 90 | 90 | 90 | 90 | 90 |

Preparation Examples 1 to 7 of Pigment Dispersion Covered with Water-insoluble Vinyl Polymer 90 parts of methylethyl ketone and a predetermined amount of neutralizing agent (5N sodium hydroxide aqueous solution) were added to 77 parts of a solution in which each of the polymers obtained in Manufacturing Examples 1 to 6 was separately prepared to be 50 percent with methylethyl ketone to neutralize methacrylic acid (degree of neutralization of 90 percent). Thereafter, 370 parts of deionized water and 90 parts of the pigment shown in Table 2 as coloring material were admixed followed by 20 passes with a dispersing machine (Microfluidizer M-140K, 150 MPa). The number of pass with the dispersing machine was 5 in the case of carbon black Nipex 150.

100 parts of deionized water was added to the thus-obtained water dispersion. Subsequent to stirring, methylethyl ketone was removed at 60 degrees C. with a reduced pressure. After water was further partially removed, the resultant was filtrated with a 25 mL volume needle-free syringe (manufactured by TERUMO CORPORATION) equipped with a syringe filter having an opening of 5 μm (acetyl cellulose film, outer diameter of 2.5 cm, manufactured by Sartorius Stedim Biotech GmbH) to remove coarse particles. Thus, a water dispersion having a solid portion of 25 percent by mass was obtained.

TABLE 2

| Preparation Example | Manufacturing Example polymer | Pigment |
|---|---|---|
| Preparation Example 1: | Manufacturing Example 1 | Carbon black Nipex 150 (manufactured by Degussa AG) |
| Preparation Example 2: | Manufacturing Example 2 | C.I.Pigment Yellow 74 (manufactured by Dainichiseika Color & Chemicals Mfg. Co., Ltd.) |
| Preparation Example 3: | Manufacturing Example 3 | C.I.Pigment Red 122 (manufactured by Dainichiseika Color & Chemicals Mfg. Co., Ltd.) |
| Preparation Example 4: | Manufacturing Example 4 | C.I.Pigment red blue 15:3 (manufactured by Dainichiseika Color & Chemicals Mfg. Co., Ltd.) |
| Preparation Example 5: | Manufacturing Example 5 | Carbon black Nipex 150 (manufactured by Degussa AG) |
| Preparation Example 6: | Manufacturing Example 6 | C.I.Pigment Red 122 (manufactured by Dainichiseika Color & Chemicals Mfg. Co., Ltd.) |
| Preparation Example 7: | Manufacturing Example 6 | C.I.Pigment red blue 15:3 (manufactured by Dainichiseika Color & Chemicals Mfg. Co., Ltd.) |

Preparation Examples 8 to 11: Preparation Examples of Surface Remodeled Pigment Dispersion Preparation Example 8

Preparation of Surface Reformed Black Pigment Dispersion 1

1 kg of pigment dispersion of SENSIJET Black SDP2000 (Solid portion: 14.5 percent by mass, manufactured by SENSIENT Corporation) was subject to acid deposition with 0.1 N HCL aqueous solution. Next, pH of the pigment dispersion was adjusted to 9 with 10 percent tetrabutyl ammonium hydroxide solution (methanol solution). 30 minutes later, a reformed pigment dispersion was obtained.

Thereafter, the thus-obtained reformed pigment dispersion containing a pigment bonded with at least one of carboxylic acid group, a sulfonic group, a carboxylic acid tetrabutyl ammonium salt, and a sulfonic acid tetrabutyl ammonium salt and deionized water were used for ultra-filtration using dialysis membrane.

Moreover, the resultant was subject to ultrasonic wave dispersion to obtain a reformed pigment dispersion in which the solid pigment portion was concentrated to 20 percent by mass. The volume average particle diameter of the thus-obtained dispersion was 120 nm as measured by a particle size distribution measuring instrument (NANOTRAC UPA-EX150, manufactured by NIKKISO CO., LTD.).

Preparation Example 9

Preparation of Surface Reformed Magenta Pigment Dispersion 1

1 kg of SENSIJET SMART Magenta 3122BA (Pigment Red 122 surface treated dispersion, solid portion: 14.5 percent by mass, manufactured by SENSIENT Corporation) was subject to acid deposition with 0.1 N HCL aqueous solution. Next, pH of the pigment dispersion was adjusted to 9 with 10 percent tetraethyl ammonium hydroxide solution. 30 minutes later, a reformed pigment dispersion was obtained.

Thereafter, the thus-obtained reformed pigment dispersion containing a pigment bonded with one amino benzoic acid group or amino benzoic acid tetraethyl ammonium salt and deionized water were used for ultra-filtration using dialysis membrane. Moreover, the resultant was subject to ultrasonic wave dispersion to obtain a reformed pigment dispersion in which the solid pigment portion was concentrated to 20 percent by mass.

The volume average particle diameter of the thus-obtained dispersion was 104 nm as measured by a particle size distribution measuring instrument (NANOTRAC UPA-EX150, manufactured by NIKKISO CO., LTD.).

Preparation Example 10

Preparation of Surface Reformed Cyan Pigment Dispersion Element 1

1 kg of SENSIJET SMART Cyan 3154BA (Pigment Blue 15:4 surface treated dispersion, solid portion: 14.5 percent by mass, manufactured by SENSIENT Corporation) was subject to acid deposition with 0.1 N HCL aqueous solution. Next, pH of the pigment dispersion was adjusted to 9 with 40 percent benzyltrimethyl ammonium hydroxide solution (methanol solution). 30 minutes later, a reformed pigment dispersion was obtained.

Thereafter, the thus-obtained reformed pigment dispersion containing a pigment bonded with one amino benzoic acid group or amino benzoic acid benzyl trimethyl ammonium salt and deionized water were used for ultra-filtration using dialysis membrane. Moreover, the resultant was subject to ultrasonic wave dispersion to obtain a reformed pigment dispersion in which the solid pigment portion was concentrated to 20 percent by mass.

The volume average particle diameter of the thus-obtained dispersion was 116 nm as measured by a particle size distribution measuring instrument (NANOTRAC UPA-EX150, manufactured by NIKKISO CO., LTD.).

Preparation Example 11

Preparation of Surface Reformed Yellow Pigment Dispersion 1

1 kg of SENSIJET SMART Yellow 3074BA (Pigment Yellow 74 surface treated dispersion, solid portion: 14.5 percent by mass, manufactured by SENSIENT Corporation) was subject to acid deposition with 0.1 N HCL aqueous solution.

Next, pH of the pigment dispersion was adjusted to 9 with 10 percent tetrabutyl ammonium hydroxide solution (methanol solution). 30 minutes later, a reformed pigment dispersion was obtained.

Thereafter, the thus-obtained reformed pigment dispersion containing a pigment bonded with one amino benzoic acid group or amino benzoic acid tetrabutyl ammonium salt and deionized water were used for ultra-filtration using dialysis membrane. Moreover, the resultant was subject to ultrasonic wave dispersion to obtain a reformed pigment dispersion in which the solid pigment portion was concentrated to 20 percent by mass.

The volume average particle diameter of the thus-obtained dispersion was 145 nm as measured by a particle size distribution measuring instrument (NANOTRAC UPA-EX150, manufactured by NIKKISO CO., LTD.).

Next are Manufacturing Examples of resin emulsions added to ink to impart fixability.

Manufacturing Examples 1 to 5 of Resin Emulsion

Manufacturing of Resin Emulsion 1

A mixture of 1.2 parts of acrylic acid as the monomer (a1), 6 parts of vinyltrimethxy silane (Sila-Ace 210, manufactured by CHISSO CORPORATION) as the monomer (a2), 35.5 parts of methylmethacrylate as the monomer (a3), 60.3 parts by mass of 2-ethylhexyl acrylate, 1.0 part of acrylamide, 1.5 parts of AQUALON KH-20 (reactive emulsifier, manufactured by DKS Co. Ltd.) as emulsifier, and 53.1 parts of deionized water were emulsified by a batch type homo-mixer to prepare a monomer pre-emulsion, which was placed in a dripping tank.

If the number of particles having a diameter of 0.5 µm or greater is 5,000 particles/cm$^3$ or more, the measuring precision deteriorates. Therefore, in order to make the number of the particles having a diameter of 0.5 µm or greater to be around 5,000 particles/cm$^3$, the monomer pre-emulsion having a monomer concentration of around 60 percent was diluted with distilled water. The volume average particle diameter of the monomer pre-emulsion about the diluted liquid in which the monomer concentration was about 0.002 percent by mass was 3.0 µm according to the number counting method for monomer pre-emulsion as measured by Accusizer (manufactured by PARTICLE SIZING SYSTEMS, USA).

89.4 parts of deionized water was loaded in a four-necked flask (having a volume of 2 L) as a reaction container equipped with a reflux condenser, a stirrer, a thermometer, a nitrogen introducing tube, and an inlet through which raw material was loaded. The liquid was stirred and heated to 60 degrees C. while introducing nitrogen into the flask. Thereafter, 0.5 parts of AQUALON KH-20 (manufactured by DKS Co. Ltd.) as alkylphenolether-based reactive emulsifier was added to the reaction container and at the same time, 6 parts of 5 percent by mass ammonium persulfate (hereinafter referred to as APS) (0.3 parts as ammonium persulfate) was added thereto.

10 minutes after the 5 percent APS aqueous solution was added to the reaction container, the monomer pre-emulsion was continuously dripped from the dripping tank to the reaction container in five hours. Also, 6 parts of the 5 percent by mass APS aqueous solution (0.3 parts as ammonium persulfate) was incessantly dripped from another dropping tank to the reaction container in five hours. The reaction container was maintained at 70 degrees C. After the dripping, the resultant was aged at 70 degrees C. for three hours. Thereafter, the resultant was cooled down to 50 degrees C. and ammonium water was added followed by filtration using a polyester cloth of 180 meshes. The agglomeration matter remaining on the filter cloth was dried at 150 degrees C. for 20 minutes. The agglomeration amount (percent by mass) was 0.1 percent by mass when obtained based on the amount of the monomer, the emulsifier, and the polymerization initiator.

The resin emulsion was partially measured and taken out after the filtration and dried at 150 degrees C. for 20 minutes. The concentration of the solid portion was 39.5 percent by mass. In addition, the resin emulsion had a pH of 8 and a viscosity of 50 mPa·s.

The limit of the measuring device is around 5,000 particles/cm$^3$ or less for particles having a size of 0.5 μm or greater. Therefore, the resin emulsion after the filtration was diluted to have a solid portion concentration of 0.002 percent by mass in order to be within such a range. The 50 percent cumulative volume particle diameter ($D_{50}$) was 130 nm according to dynamic light scattering method using microtrac UPA (manufactured by Leeds & Northrup).

Separately, after the filtration, the resin emulsion was diluted to have a solid portion concentration of 0.002 percent by mass and the diluted liquid was subject to number counting method to obtain the number of super coarse particles having a particle diameter of 1.5 μm or greater using Accusizer (manufactured by PARTICLE SIZING SYSTEMS, USA). The number of super coarse particles having a particle diameter of 1.5 μm or greater in the resin emulsion was $1.0 \times 10^5$ particles/cm$^3$ in conversion of 0.1 percent by mass of the solid portion concentration.

The glass transition temperature (hereinafter, referred to as theoretical Tg) obtained from the monomers excluding vinyl trimethoxyxilane was 5 degrees C.

Manufacturing of Resin Emulsion 2

Resin emulsion 2 was manufactured in the same manner as in Manufacturing Example 1 except that the recipe in the Manufacturing Example 1 was changed to the following recipe.

Composition
Acrylic acid: 3.0 parts
Butyl acrylate: 12.5 parts
2-Ethylhexyl acrylate: 20.0 parts
Styrene: 22.0 parts
Vinyl trimethoxyxilane (Sila-Ace 210, manufactured by Chisso Corporation): 6 parts The 50 percent cumulative volume particle diameter ($D_{50}$) of the thus-obtained resin emulsion 2 was 100 nm as measured by dynamic light scattering method. In addition, the theoretical Tg obtained from the monomers excluding vinyl trimethoxyxilane was 15 degrees C. The solid portion concentration was 39.6 percent by mass.

Manufacturing of Resin Emulsion 3

Resin emulsion 3 was manufactured in the same manner as in Manufacturing Example 1 except that the recipe in the Manufacturing Example 1 was changed to the following recipe.

Composition
Acrylic acid: 5.0 parts
2-Ethylhexyl acrylate: 22.0 parts
2-ethylhexyl methacryatte: 6.0 parts
Methacrylic acid cyclohexyl: 5.0 parts
Styrene: 22.0 parts
Vinyl trimethoxyxilane (Sila-Ace 210, manufactured by Chisso Corporation): 6 parts The 50 percent cumulative volume particle diameter ($D_{50}$) of the thus-obtained resin emulsion 3 was 80 nm as measured by dynamic light scattering method. In addition, the theoretical Tg obtained from the monomers excluding vinyl trimethoxyxilane was 30 degrees C. The solid portion concentration was 39.4 percent by mass.

Manufacturing of Resin Emulsion 4

Resin emulsion 4 was manufactured in the same manner as in Manufacturing Example 1 except that the recipe in the Manufacturing Example 1 was changed to the following recipe.

Composition
Methacrylic acid: 3.0 parts
Butyl acrylate: 25.0 parts
Acrylic Amide: 1.0 part
Styrene: 29.0 parts
Vinyl trimethoxyxilane (Sila-Ace 210, manufactured by Chisso Corporation): 6 parts The 50 percent cumulative volume particle diameter ($D_{50}$) of the thus-obtained resin emulsion 4 was 80 nm as measured by dynamic light scattering method. In addition, the theoretical Tg obtained from the monomers excluding vinyl trimethoxyxilane was 45 degrees C. The solid portion concentration was 39.5 percent by mass.

Manufacturing of Resin Emulsion 5

Resin emulsion 5 was manufactured in the same manner as in Manufacturing Example 1 except that the recipe in the Manufacturing Example 1 was changed to the following recipe.

Composition
Methacrylic acid: 6.0 parts
Ethyl acrylate: 20.0 parts
Methyl methacrylate: 16.0 parts
Acrylic Amide: 1.0 part
Styrene: 20.0 parts
Vinyl trimethoxyxilane (Sila-Ace 210, manufactured by Chisso Corporation): 6 parts The 50 percent cumulative volume particle diameter ($D_{50}$) of the thus-obtained resin emulsion 5 was 90 nm as measured by dynamic light scattering method. In addition, the theoretical Tg obtained from the monomers excluding vinyl trimethoxyxilane was 70 degrees C. The solid portion concentration was 39.7 percent by mass.

Example 1

Preparation of Ink 15.00 parts of 3-n-buthoxy-N,N-dimethyl propanamide represented by Chemical structure I, 20.00 parts of 1,2-propanediol, 0.50 parts of polyether-modified siloxane compound represented by Chemical formula VI, and 0.25 parts of aliphatic alcohol alkylene oxide compound represented by Chemical formula IV were loaded in a container equipped with a stirrer and stirred for 30 minutes to obtain a homogeneous mixture.

Thereafter, 0.05 parts of mildew-proofing agent (Proxel GXL, manufactured by Lonza Group AG), 0.20 parts of 2-amino-2-ethyl-1,3-propane diol, 34.29 parts of the surface reformed black pigment dispersion of Preparation Example 1, and a balance of deionized water to make the entire 100 parts were added to the homogeneous mixture and stirred for 60 minutes to obtain a homogeneous ink. The thus-obtained ink was filtrated with a polyvinilydene fluoride membrane filter having an average opening diameter of 1.2 μm with an increased pressure to remove coarse particles and dust. Thus, ink of Example 1 was prepared.

Example 2

20.00 parts of 1,2-propanediol, 20.00 parts of 1,2-butanediol, 4.00 parts of 2,2,4-trimethyl-1,3-pentanediol, 0.25 parts of polyether-modified siloxane compound represented by Chemical formula VII, and 0.25 parts of aliphatic alcohol alkylene oxide compound represented by Chemical formula IV were charged in a container equipped with a stirrer and stirred for 30 minutes to obtain a homogeneous mixture.

Thereafter, 0.05 parts of mildew-proofing agent (Proxel GXL, manufactured by Lonza Group AG), 0.20 parts of 2-amino-2-ethyl-1,3-propanediol, 34.29 parts of the surface reformed black pigment dispersion of Preparation Example 1, 12.63 parts of resin emulsion 2 of Manufacturing Example 2, and a balance of deionized water to make the entire 100 parts were added to the homogeneous mixture and stirred for 60 minutes to obtain a homogeneous ink. Thereafter, the thus-obtained ink was filtrated with a polyvinilydene fluoride membrane filter having an average opening diameter of 1.2 μm with an increased pressure to remove coarse particles and dust. Thus, ink of Example 2 was prepared.

Examples 3 to 18 and Comparative Examples 1 to 12

The organic solvents, surfactants, and the deforming agents shown in Tables 3-1 to 3-7 were mixed and stirred in the same manner as in Example 1 or Example 2. Thereafter, the mildew-proofing agent, the pH regulator, the coloring material (pigment dispersion), and the resin emulsion shown in Tables 3-1 to 3-5 were mixed and stirred to obtain a homogeneous ink. Thereafter, the thus-obtained ink was filtrated with a polyvinilydene fluoride membrane filter having an average opening diameter of 1.2 μm with an increased pressure to remove coarse particles and dust. Thus, inks of Examples 3 to 18 and Comparative Examples 1 to 12 were prepared.

As shown in Table 3-4, the adduct (A-1) of 2-ethyl-1-hexanol with 4 mol of EO, the random adduct (A-6) of decanol with 2 mols of EO (5 mols of EO/1 mol of PO), and the adduct (A-9) of 3,5,5-trimethyl-1-hexanol with 3 mols of EO and 2 mols of EO respectively obtained by synthesis according to the synthesis methods of Synthesis Example 1, Synthesis Example 6, and Synthesis Example 9 were used as surfactants in Examples 16, 17, and 18.

TABLE 3-1

| Component (percent by mass) | | Example 1 | Example 2 | Example 3 | Example 4 | Example 5 |
|---|---|---|---|---|---|---|
| Water-dispersible coloring material (pigment dispersion) | Preparation Example 1 (Carbon black Nipex 150) | 34.29 | 34.29 | — | — | — |
| | Preparation Example 2 (C.I.Pigment Yellow 74) | — | — | 22.86 | — | — |
| | Preparation Example 3 (C.I.Pigment Red 122) | — | — | — | 34.29 | — |
| | Preparation Example 4 (C.I.Pigment Blue 15:3) | — | — | — | — | 17.14 |
| | Preparation Example 5 (Carbon black Nipex 150) | — | — | — | — | — |
| | Preparation Example 6 (C.I.Pigment Red 122) | — | — | — | — | — |
| | Preparation Example 7 (C.I.Pigment Blue 15:3) | — | — | — | — | — |
| | Preparation Example 8 surface reformed black pigment dispersion (1) | — | — | — | — | — |
| | Preparation Example 9 surface reformed magenta pigment dispersion (1) | — | — | — | — | — |
| | Preparation Example 10 surface reformed cyan pigment dispersion (1) | — | — | — | — | — |
| | Preparation Example 11 surface reformed yellow pigment dispersion (1) | — | — | — | — | — |
| Water-dispersible resin | Resin emulsion 1 (Tg: 5 degrees C.) | 12.66 | — | — | — | — |
| | Resin emulsion 2 (Tg: 15 degrees C.) | — | 12.63 | — | — | — |
| | Resin emulsion 3 (Tg: 30 degrees C.) | — | — | 17.77 | — | — |
| | Resin emulsion 4 (Tg: 45 degrees C.) | — | — | — | 12.66 | — |
| | Resin emulsion 5 (Tg: 70 degrees C.) | — | — | — | — | 20.15 |

TABLE 3-1-continued

| Component (percent by mass) | | | Example 1 | Example 2 | Example 3 | Example 4 | Example 5 |
|---|---|---|---|---|---|---|---|
| Organic solvent | Organic solvent | Chemical structure (I) 3-n-buthoxy-N,N-dimethyl propanamide (SP value: 9.03) | 15.00 | — | — | — | — |
| | | Chemical structure (III) 3-n-hexyloxy-N,N-dimethyl propanamide (SP value: 8.96) | — | — | — | — | — |
| | | Chemical structure (IV) 3-ethyl-3-hydroxyl methyl oxetane (SP value: 11.3) | — | — | 27.50 | 10.00 | 5.00 |
| | | Chemical structure (V) 3-Methyl-3-hydroxyl methyl oxetane (SP value: 11.79) | — | — | — | — | — |
| | | 3-Methyl-1,3-butane diol (SP value: 12.05) | — | — | — | 30.00 | 30.00 |
| | | 1,2-butane diol (SP value: 12.75) | — | 20.00 | 10.00 | — | — |
| | | 1,2-Propane diol (SP value: 13.5) | 20.00 | 20.00 | — | — | — |
| | | Triethylene glycol butyhlmethyl ether (SP value: 8.41) | — | — | — | — | — |
| | Humectant | Glycerin (SP value: 16.38) | — | — | — | — | — |
| | | Triethylene glycol (SP value: 15.4) | — | — | — | — | — |
| | Permeating agent | 2-ethyl-1,3-hexanediol (SP value: 10.6) | — | — | 2.00 | 2.00 | 2.00 |
| | | 2,2,4-trimethyl-1,3-pentanediol (SP value: 10.8) | — | 4.00 | — | — | — |
| | Surfactant | Chemical formula VI (Silface SAG-002) | 0.50 | — | — | — | — |
| | | Chemical formula VII (Silface SAG-013) | — | 0.25 | — | — | — |
| | | Chemical formula VIII (Silface SJM-003) | — | — | 0.01 | 0.005 | — |
| | | Chemical formula VIII (Silface SAG-503A) | — | — | — | — | 0.20 |
| | | Chemical formula VIII (BYK-348) | — | — | — | — | — |
| | | Chemical formula IX (TEGO Wet 270) | — | — | — | — | — |
| | | Chemical formula IV (Newcol NT-5) | 0.25 | — | — | — | — |
| | | Chemical formula IV (NOIGEN XL-40) | — | 0.25 | — | — | — |
| | | Chemical formula IV (NOIGEN DX-50) | — | — | 0.99 | 0.500 | — |
| | | Chemical formula IV (NOIGEN ET-65) | — | — | — | — | 0.50 |
| | | Chemical formula XIV (Synthesis Example 1: A-1) | — | — | — | — | — |
| | | Chemical formula XIV (Synthesis Example 6: A-6) | — | — | — | — | — |
| | | Chemical formula XIV (Synthesis Example 9: A-9) | — | — | — | — | — |

TABLE 3-1-continued

| Component (percent by mass) | | Example 1 | Example 2 | Example 3 | Example 4 | Example 5 |
|---|---|---|---|---|---|---|
| | Surfynol 104E | — | — | — | — | — |
| | Fluorochemical nonionic surfactant (Capstone™ FS-3100 (manufactured by E.I. du Pont de Nemours and Company) | — | — | — | — | — |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | — | — | — | — | 0.40 |
| | 2,5,8,11-tetramethyldodecane-5,8-diol | — | — | 0.40 | 0.40 | — |
| pH regulator | 2-amino-2-ethyl-1,3-propane diol | 0.20 | 0.20 | 0.20 | 0.10 | 0.10 |
| Wax | Polyethylene wax 1 (AQUACER531) | — | — | — | — | 0.22 |
| | Polyethylene wax 2 (AQUACER515) | — | — | — | — | — |
| | Polyethylene wax 3 (AQUACER 3RC 1452) | — | — | — | — | — |
| | Pure water | Balance | Balance | Balance | Balance | Balance |
| | Total (Percent by mass) | 100 | 100 | 100 | 100 | 100 |

TABLE 3-2

| Component (percent by mass) | | Example 6 | Example 7 | Example 8 | Example 9 | Example 10 |
|---|---|---|---|---|---|---|
| Water-dispersible coloring material (pigment dispersion) | Water-dispersible coloring material (pigment dispersion) | — | — | — | — | — |
| | Preparation Example 2 (C.I.Pigment Yellow 74) | — | — | — | — | — |
| | Preparation Example 3 (C.I.Pigment Red 122) | — | — | — | — | — |
| | Preparation Example 4 (C.I.Pigment Blue 15:3) | — | — | — | — | — |
| | Preparation Example 5 (Carbon black Nipex 150) | 34.29 | — | — | — | — |
| | Preparation Example 6 (C.I.Pigment Red 122) | — | 34.29 | — | — | — |
| | Preparation Example 7 (C.I.Pigment Blue 15:3) | — | — | 17.14 | — | — |
| | Preparation Example 8 surface reformed black pigment dispersion (1) | — | — | — | 30.00 | — |
| | Preparation Example 9 surface reformed magenta pigment dispersion (1) | — | — | — | — | 30.00 |
| | Preparation Example 10 surface reformed cyan pigment dispersion (1) | — | — | — | — | — |
| | Preparation Example 11 surface reformed yellow pigment dispersion (1) | — | — | — | — | — |

TABLE 3-2-continued

| Component (percent by mass) | | Example 6 | Example 7 | Example 8 | Example 9 | Example 10 |
|---|---|---|---|---|---|---|
| Water-dispersible resin | Water-dispersible resin | 12.66 | — | — | — | — |
| | Resin emulsion 2 (Tg: 15° C.) | — | — | — | — | — |
| | Resin emulsion 3 (Tg: 30° C.) | — | — | — | — | — |
| | Resin emulsion 4 (Tg: 45° C.) | — | — | 20.25 | — | — |
| | Resin emulsion 5 (Tg: 70° C.) | — | — | — | 12.59 | 12.59 |
| Organic solvent | Organic solvent | | | | | |
| | Chemical structure (I) 3-n-buthoxy-N,N-dimethyl propanamide (SP value: 9.03) | 10.00 | — | — | — | — |
| | Chemical structure (III) 3-n-hexyloxy-N,N-dimethyl propanamide (SP value: 8.96) | — | — | — | — | — |
| | Chemical structure (IV) 3-ethyl-3-hydroxyl methyl oxetane (SP value: 11.3) | — | 15.00 | 10.00 | 10.00 | 10.00 |
| | Chemical structure (V) 3-Methyl-3-hydroxyl methyl oxetane (SP value: 11.79) | — | — | — | — | — |
| | 3-Methyl-1,3-butane diol (SP value: 12.05) | 15.00 | 20.00 | 25.00 | 20.00 | 20.00 |
| | 1,2-butane diol (SP value: 12.75) | — | — | — | — | — |
| | 1,2-Propane diol (SP value: 13.5) | 10.00 | — | — | — | — |
| | Triethylene glycol butyhlmethyl ether (SP value: 8.41) | — | — | — | — | — |
| Humectant | Glycerin (SP value: 16.38) | — | — | — | — | — |
| | Triethylene glycol (SP value: 15.4) | — | — | — | — | — |
| Permeating agent | 2-ethyl-1,3-hexanediol (SP value: 10.6) | 1.00 | 2.00 | 2.00 | 2.00 | 2.00 |
| | 2,2,4-trimethyl-1,3-pentanediol (SP value: 10.8) | — | — | — | — | — |
| Surfactant | Surfactant | — | — | — | — | — |
| | Chemical formula VII (Silface SAG-013) | — | — | — | — | — |
| | Chemical formula VIII (Silface SJM-003) | — | — | — | — | — |
| | Chemical formula VIII (Silface SAG-503 A) | — | — | 1.00 | — | — |
| | Chemical formula VIII (BYK-348) | 0.50 | — | — | — | 0.20 |
| | Chemical formula IX (TEGO Wet 270) | — | 0.15 | — | 0.10 | — |
| | Chemical formula IV (NewcolNT-5) | 0.30 | — | — | — | — |
| | Chemical formula IV (NOIGEN XL-40) | — | — | 0.02 | — | — |
| | Chemical formula IV (NOIGEN DX-50) | — | — | — | 0.40 | — |
| | Chemical formula IV (NOIGEN ET-65) | — | 0.35 | — | — | 0.40 |
| | Chemical formula XIV (Synthesis Example 1: A-1) | — | — | — | — | — |
| | Chemical formula XIV (Synthesis Example 6: A-6) | — | — | — | — | — |

TABLE 3-2-continued

| Component (percent by mass) | | Example 6 | Example 7 | Example 8 | Example 9 | Example 10 |
|---|---|---|---|---|---|---|
| | Chemical formula XIV (Synthesis Example 9: A-9) | — | — | — | — | — |
| | Surfynol 104E | — | — | — | — | — |
| | Fluorochemical nonionic surfactant (Capstone™ FS-3100 (manufactured by E.I. du Pont de Nemours and Company) | | | | | |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 | 0.40 |
| | 2,5,8,11-tetramethyldodecane-5,8-diol | — | — | — | — | — |
| pH regulator | 2-amino-2-ethyl-1,3-propane diol | 0.20 | 0.20 | 0.20 | 0.20 | 0.20 |
| Wax | Polyethylene wax 1 (AQUACER 531) | — | 0.33 | — | — | 0.67 |
| | Polyethylene wax 2 (AQUACER 515) | 0.29 | — | 0.43 | — | — |
| | Polyethylene wax 3 (AQUACER 3RC 1452) | — | — | — | 0.47 | — |
| Pure water | | Balance | Balance | Balance | Balance | Balance |
| Total (Percent by mass) | | 100 | 100 | 100 | 100 | 100 |

TABLE 3-3

| Component (percent by mass) | | Example 11 | Example 12 | Example 13 | Example 14 | Example 15 |
|---|---|---|---|---|---|---|
| Water-dispersible coloring material (pigment dispersion) | Water-dispersible coloring material (pigment dispersion) | — | — | — | — | — |
| | Preparation Example 2 (C.I.Pigment Yellow 74) | — | — | — | — | — |
| | Preparation Example 3 (C.I.Pigment Red 122) | — | — | — | — | — |
| | Preparation Example 4 (C.I.Pigment Blue 15:3) | — | — | — | — | — |
| | Preparation Example 5 (Carbon black Nipex 150) | — | — | — | — | — |
| | Preparation Example 6 (C.I.Pigment Red 122) | — | — | — | — | — |
| | Preparation Example 7 (C.I.Pigment Blue 15:3) | — | — | — | — | — |
| | Preparation Example 8 surface reformed black pigment dispersion (1) | — | — | — | — | — |
| | Preparation Example 9 surface reformed magenta pigment dispersion (1) | — | — | 32.50 | — | — |
| | Preparation Example 10 surface reformed cyan pigment dispersion (1) | 15.00 | — | — | 12.50 | — |
| | Preparation Example 11 surface reformed yellow pigment dispersion (1) | — | 20.00 | — | — | 15.00 |

TABLE 3-3-continued

| Component (percent by mass) | | Example 11 | Example 12 | Example 13 | Example 14 | Example 15 |
|---|---|---|---|---|---|---|
| Water-dispersible resin | Water-dispersible resin | — | — | — | — | — |
| | Resin emulsion 2 (Tg: 15° C.) | — | — | — | — | — |
| | Resin emulsion 3 (Tg: 30° C.) | — | — | — | — | — |
| | Resin emulsion 4 (Tg: 45° C.) | 20.25 | 17.72 | — | — | — |
| | Resin emulsion 5 (Tg: 70° C.) | — | — | 11.34 | 21.41 | 20.15 |
| Organic solvent | Organic solvent | | | | | |
| | Chemical structure (I) 3-n-buthoxy-N,N-dimethyl propanamide (SP value: 9.03) | — | — | 5.00 | 5.00 | 5.00 |
| | Chemical structure (III) 3-n-hexyloxy-N,N-dimethyl propanamide (SP value: 8.96) | — | — | — | — | — |
| | Chemical structure (IV) 3-ethyl-3-hydroxyl methyl oxetane (SP value: 11.3) | 10.00 | 10.00 | 15.00 | 15.00 | 15.00 |
| | Chemical structure (V) 3-Methyl-3-hydroxyl methyl oxetane (SP value: 11.79) | — | — | — | — | — |
| | 3-Methyl-1,3-butane diol (SP value: 12.05) | 25.00 | 25.00 | 15.00 | 20.00 | 20.00 |
| | 1,2-butane diol (SP value: 12.75) | — | — | — | — | — |
| | 1,2-Propane diol (SP value: 13.5) | — | — | — | — | — |
| | Triethylene glycol butyhlmethyl ether (SP value: 8.41) | — | — | — | — | — |
| Humectant | Glycerin (SP value: 16.38) | — | — | — | — | — |
| | Triethylene glycol (SP value: 15.4) | — | — | — | — | — |
| Permeating agent | 2-ethyl-l,3-hexanediol (SP value: 10.6) | 2.00 | 2.00 | 2.00 | 2.00 | 2.00 |
| | 2,2,4-trimethyl-1,3-pentanediol (SP value: 10.8) | — | — | — | — | — |
| Surfactant | Surfactant | — | — | 0.30 | — | — |
| | Chemical formula VII (Silface SAG-013) | — | — | — | 0.30 | — |
| | Chemical formula VIII (Silface SJM-003) | — | — | — | — | 0.30 |
| | Chemical formula VIII (Silface SAG-503A) | 0.30 | — | — | — | — |
| | Chemical formula VIII (BYK-348) | — | — | — | — | — |
| | Chemical formula IX (TEGO Wet 270) | — | 0.20 | — | — | — |
| | Chemical formula IV (Newcol NT-5) | — | — | — | — | — |
| | Chemical formula IV (NOIGEN XL-40) | 0.40 | 0.40 | 0.35 | — | — |
| | Chemical formula IV (NOIGEN DX-50) | — | — | — | 0.35 | — |
| | Chemical formula IV (NOIGEN ET-65) | — | — | — | — | 0.35 |
| | Chemical formula XIV (Synthesis Example 1: A-1) | — | — | — | — | — |
| | Chemical formula XIV (Synthesis Example 6: A-6) | — | — | — | — | — |

TABLE 3-3-continued

| Component (percent by mass) | | Example 11 | Example 12 | Example 13 | Example 14 | Example 15 |
|---|---|---|---|---|---|---|
| | Chemical formula XIV (Synthesis Example 9: A-9) | — | — | — | — | — |
| | Surfynol 104E | — | — | — | — | — |
| | Fluorochemical nonionic surfactant (Capstone™ FS-3100 (manufactured by E.I. du Pont de Nemours and Company) | — | — | — | — | — |
| Mildew-proofing agent | Proxel GXL | 0.05 | 0.05 | 0.05 | 0.05 | 0.05 |
| Foam Inhibitor (Defoaming Agent) | 2,4,7,9-tetramethyldecane-4,7-diol | — | — | 0.40 | 0.40 | 0.40 |
| | 2,5,8,11-tetramethyldodecane-5,8-diol | 0.40 | 0.40 | — | — | — |
| pH regulator | 2-amino-2-ethyl-1,3-propane diol | 0.10 | 0.10 | 0.20 | 0.20 | 0.20 |
| Wax | Polyethylene wax 1 (AQUACER 531) | — | — | 1.00 | — | — |
| | Polyethylene wax 2 (AQUACER 515) | 0.86 | — | — | 1.29 | — |
| | Polyethylene wax 3 (AQUACER 3RC 1452) | — | 0.94 | — | — | 1.41 |
| Pure water | | Balance | Balance | Balance | Balance | Balance |
| Total (Percent by mass) | | 100 | 100 | 100 | 100 | 100 |

TABLE 3-4

| Component (percent by mass) | | Example 16 | Example 17 | Example 18 |
|---|---|---|---|---|
| Water-dispersible coloring material (pigment dispersion) | Water-dispersible coloring material (pigment dispersion) | — | — | — |
| | Preparation Example 2 (C.I.Pigment Yellow 74) | — | — | — |
| | Preparation Example 3 (C.I.Pigment Red 122) | — | — | — |
| | Preparation Example 4 (C.I.Pigment Blue 15:3) | 17.14 | — | — |
| | Preparation Example 5 (Carbon black Nipex 150) | — | — | — |
| | Preparation Example 6 (C.I.Pigment Red 122) | — | — | — |
| | Preparation Example 7 (C.I.Pigment Blue 15:3) | — | — | — |
| | Preparation Example 8 surface reformed black pigment dispersion (1) | — | — | — |
| | Preparation Example 9 surface reformed magenta pigment dispersion (1) | — | 30.00 | — |
| | Preparation Example 10 surface reformed cyan pigment dispersion (1) | — | — | — |
| | Preparation Example 11 surface reformed yellow pigment dispersion (1) | — | — | 20.00 |
| Water-dispersible resin | Water-dispersible resin | — | — | — |
| | Resin emulsion 2 (Tg: 15° C.) | — | — | — |
| | Resin emulsion 3 (Tg: 30° C.) | — | — | — |
| | Resin emulsion 4 (Tg: 45° C.) | — | — | 17.72 |
| | Resin emulsion 5 (Tg: 70° C.) | 20.15 | 12.59 | — |
| Organic solvent | Organic solvent | | | |
| | Chemical structure (I) 3-n-buthoxy-N,N-dimethyl propanamide (SP value: 9.03) | — | — | — |
| | Chemical structure (III) 3-n-hexyloxy-N,N-dimethyl propanamide (SP value: 8.96) | 5.00 | — | — |
| | Chemical structure (IV) 3-ethyl-3-hydroxyl methyl oxetane (SP value: 11.3) | — | — | — |
| | Chemical structure (V) 3-Methyl-3-hydroxyl methyl oxetane (SP value: 11.79) | — | 10.00 | 10.00 |
| | 3-Methyl-1,3-butane diol (SP value: 12.05) | 30.00 | 20.00 | 25.00 |
| | 1,2-butane diol (SP value: 12.75) | — | — | — |
| | 1,2-Propane diol (SP value: 13.5) | — | — | — |

TABLE 3-4-continued

| Component (percent by mass) | | Example 16 | Example 17 | Example 18 |
|---|---|---|---|---|
| Humectant | Triethylene glycol butyhlmethyl ether (SP value: 8.41) | — | — | — |
| | Glycerin (SP value: 16.38) | — | — | — |
| | Triethylene glycol (SP value: 15.4) | — | — | — |
| Permeating agent | 2-ethyl-1,3-hexanediol (SP value: 10.6) | 2.00 | 2.00 | 2.00 |
| | 2,2,4-trimethyl-1,3-pentanediol (SP value: 10.8) | — | — | — |
| Surfactant | Surfactant | — | — | — |
| | Chemical formula VII (Silface SAG-013) | — | — | — |
| | Chemical formula VIII (Silface SJM-003) | — | — | — |
| | Chemical formula VIII (Silface SAG-503A) | 0.20 | — | — |
| | Chemical formula VIII (BYK-348) | — | 0.20 | — |
| | Chemical formula IX (TEGO Wet 270) | — | — | 0.20 |
| | Chemical formula IV (Newcol NT-5) | — | — | — |
| | Chemical formula IV (NOIGEN XL-40) | — | — | — |
| | Chemical formula IV (NOIGEN DX-50) | — | — | — |
| | Chemical formula IV (NOIGEN ET-65) | — | — | — |
| | Chemical formula XIV (Synthesis Example 1: A-1) | 0.50 | — | — |
| | Chemical formula XIV (Synthesis Example 6: A-6) | — | 0.40 | — |
| | Chemical formula XIV (Synthesis Example 9: A-9) | — | — | 0.40 |
| | Surfynol 104E | — | — | — |
| | Fluorochemical nonionic surfactant (Capstone™ FS-3100 (manufactured by E. I. du Pont de Nemours and Company) | — | — | — |
| Mildew-proofing agent | Proxel GXL | 0.05 | 0.05 | 0.05 |
| Foam Inhibitor (Defoaming Agent) | 2,4,7,9-tetramethyldecane-4,7-diol | 0.40 | 0.40 | — |
| | 2,5,8,11-tetramethyldodecane-5,8-diol | — | — | 0.40 |
| pH regulator | 2-amino-2-ethyl-1,3-propane diol | 0.10 | 0.20 | 0.10 |
| Wax | Polyethylene wax 1 (AQUACER 531) | 0.22 | 0.67 | — |
| | Polyethylene wax 2 (AQUACER 515) | — | — | — |
| | Polyethylene wax 3 (AQUACER 3RC 1452) | — | — | 0.94 |
| Pure water | | Balance | Balance | Balance |
| Total (Percent by mass) | | 100 | 100 | 100 |

TABLE 3-5

| Component (percent by mass) | | Comparative Example 1 | Comparative Example 2 | Comparative Example 3 | Comparative Example 4 |
|---|---|---|---|---|---|
| Water-dispersible coloring material (pigment dispersion) | Water-dispersible coloring material (pigment dispersion) | — | — | — | — |
| | Preparation Example 2 (C.I.Pigment Yellow 74) | — | — | — | — |
| | Preparation Example 3 (C.I.Pigment Red 122) | — | — | — | — |
| | Preparation Example 4 (C.I.Pigment Blue 15:3) | — | — | — | — |
| | Preparation Example 5 (Carbon black Nipex 150) | — | — | — | — |
| | Preparation Example 6 (C.I.Pigment Red 122) | 34.29 | 34.29 | — | — |
| | Preparation Example 7 (C.I.Pigment Blue 15:3) | — | — | 13.14 | 13.14 |
| | Preparation Example 8 surface reformed black pigment dispersion (1) | — | — | — | — |
| | Preparation Example 9 surface reformed magenta pigment dispersion (1) | — | — | — | — |

TABLE 3-5-continued

| Component (percent by mass) | | Comparative Example 1 | Comparative Example 2 | Comparative Example 3 | Comparative Example 4 |
|---|---|---|---|---|---|
| | Preparation Example 10 surface reformed cyan pigment dispersion (1) | — | — | — | — |
| | Preparation Example 11 surface reformed yellow pigment dispersion (1) | — | — | — | — |
| Water-dispersible resin | Water-dispersible resin | | | | |
| | Resin emulsion 2 (Tg: 15° C.) | — | — | — | — |
| | Resin emulsion 3 (Tg: 30° C.) | — | — | — | — |
| | Resin emulsion 4 (Tg: 45° C.) | — | — | 20.25 | 20.25 |
| | Resin emulsion 5 (Tg: 70° C.) | — | — | — | — |
| Organic solvent / Organic solvent | Chemical structure (I) 3-n-buthoxy-N,N-dimethyl propanamide (SP value: 9.03) | 10.00 | — | — | — |
| | Chemical structure (III) 3-n-hexyloxy-N,N-dimethyl propanamide (SP value: 8.96) | — | — | — | — |
| | Chemical structure (IV) 3-ethyl-3-hydroxyl methyl oxetane (SP value: 11.3) | — | — | 15.00 | 15.00 |
| | Chemical structure (V) 3-Methyl-3-hydroxyl methyl oxetane (SP value: 11.79) | — | — | — | — |
| | 3-Methyl-1,3-butane diol (SP value: 12.05) | — | — | 20.00 | 20.00 |
| | 1,2-butane diol (SP value: 12.75) | 5.00 | — | — | — |
| | 1,2-Propane diol (SP value: 13.5) | — | — | — | — |
| | Triethylene glycol butyhlmethyl ether (SP value: 8.41) | — | — | — | — |
| Humectant | Glycerin (SP value: 16.38) | 22.00 | 30.00 | — | — |
| | Triethylene glycol (SP value: 15.4) | — | 12.50 | — | — |
| Permeating agent | 2-ethyl-1,3-hexanediol (SP value: 10.6) | 2.00 | 2.00 | 2.00 | 2.00 |
| | 2,2,4-trimethyl-1,3-pentanediol (SP value: 10.8) | — | — | — | — |
| Surfactant | Surfactant | — | — | — | — |
| | Chemical formula VII (Silface SAG-013) | — | — | — | — |
| | Chemical formula VIII (Silface SJM-003) | — | — | — | — |
| | Chemical formula VIII (Silface SAG-503A) | — | — | — | — |
| | Chemical formula VIII (BYK-348) | — | — | — | — |
| | Chemical formula IX (TEGO Wet 270) | — | — | 2.00 | — |
| | Chemical formula IV (Newcol NT-5) | — | — | — | — |
| | Chemical formula IV (NOIGEN XL-40) | — | — | — | 2.00 |

TABLE 3-5-continued

| Component (percent by mass) | | Comparative Example 1 | Comparative Example 2 | Comparative Example 3 | Comparative Example 4 |
|---|---|---|---|---|---|
| | Chemical formula IV (NOIGEN DX-50) | — | — | — | — |
| | Chemical formula IV (NOIGEN ET-65) | 0.35 | 0.35 | — | — |
| | Chemical formula XIV (Synthesis Example 1: A-1) | — | — | — | — |
| | Chemical formula XIV (Synthesis Example 6: A-6) | — | — | — | — |
| | Chemical formula XIV (Synthesis Example 9: A-9) | — | — | — | — |
| | Surfynol 104E | — | — | — | — |
| | Fluorochemical nonionic surfactant (Capstone ™ FS-3100 (manufactured by E. I. du Pont de Nemours and Company) | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.40 | 0.40 | 0.40 | 0.40 |
| | 2,5,8,11-tetramethyldodecane-5,8-diol | — | — | — | — |
| pH regulator | 2-amino-2-ethyl-1,3-propane diol | 0.10 | 0.20 | 0.20 | 0.20 |
| Wax | Polyethylene wax 1 (AQUACER 531) | 0.33 | 0.33 | — | — |
| | Polyethylene wax 2 (AQUACER 515) | — | — | 0.43 | 0.43 |
| | Polyethylene wax 3 (AQUACER 3RC 1452) | — | — | — | — |
| Pure water | | Balance | Balance | Balance | Balance |
| Total (Percent by mass) | | 100 | 100 | 100 | 100 |

TABLE 3-6

| Component (percent by mass) | | Comparative Example 5 | Comparative Example 6 | Comparative Example 7 | Comparative Example 8 |
|---|---|---|---|---|---|
| Water-dispersible coloring material (pigment dispersion) | Water-dispersible coloring material (pigment dispersion) | — | — | — | — |
| | Preparation Example 2 (C.I.Pigment Yellow 74) | — | — | — | — |
| | Preparation Example 3 (C.I.Pigment Red 122) | — | — | 34.29 | 34.29 |
| | Preparation Example 4 (C.I.Pigment Blue 15:3) | — | — | — | — |
| | Preparation Example 5 (Carbon black Nipex 150) | — | — | — | — |
| | Preparation Example 6 (C.I.Pigment Red 122) | — | — | — | — |
| | Preparation Example 7 (C.I.Pigment Blue 15:3) | 13.14 | 13.14 | — | — |
| | Preparation Example 8 surface reformed black pigment dispersion (1) | — | — | — | — |

TABLE 3-6-continued

| Component (percent by mass) | | Comparative Example 5 | Comparative Example 6 | Comparative Example 7 | Comparative Example 8 |
|---|---|---|---|---|---|
| | Preparation Example 9 surface reformed magenta pigment dispersion (1) | — | — | — | — |
| | Preparation Example 10 surface reformed cyan pigment dispersion (1) | — | — | — | — |
| | Preparation Example 11 surface reformed yellow pigment dispersion (1) | — | — | — | — |
| Water-dispersible resin | Water-dispersible resin | — | — | — | — |
| | Resin emulsion 2 (Tg: 15° C.) | — | — | — | — |
| | Resin emulsion 3 (Tg: 30° C.) | — | — | — | — |
| | Resin emulsion 4 (Tg: 45° C.) | 20.25 | 20.25 | 12.66 | 12.66 |
| | Resin emulsion 5 (Tg: 70° C.) | — | — | — | — |
| Organic solvent | Organic solvent | Chemical structure (I) 3-n-buthoxy-N,N-dimethyl propanamide (SP value: 9.03) | — | — | — | — |
| | Chemical structure (III) 3-n-hexyloxy-N,N-dimethyl propanamide (SP value: 8.96) | — | — | — | — |
| | Chemical structure (IV) 3-ethyl-3-hydroxyl methyl oxetane (SP value: 11.3) | — | — | — | — |
| | Chemical structure (V) 3-Methyl-3-hydroxyl methyl oxetane (SP value: 11.79) | — | — | — | — |
| | 3-Methyl-1,3-butane diol (SP value: 12.05) | — | — | 30.00 | 30.00 |
| | 1,2-butane diol (SP value: 12.75) | 15.00 | 15.00 | — | — |
| | 1,2-Propane diol (SP value: 13.5) | 20.00 | 20.00 | — | — |
| | Triethylene glycol butyhlmethyl ether (SP value: 8.41) | — | — | — | — |
| Humectant | Glycerin (SP value: 16.38) | — | — | 10.00 | 10.00 |
| | Triethylene glycol (SP value: 15.4) | — | — | — | — |
| Permeating agent | 2-ethyl-1,3-hexanediol (SP value: 10.6) | — | — | 2.00 | 2.00 |
| | 2,2,4-trimethyl-1,3-pentanediol (SP value: 10.8) | — | — | — | — |
| Surfactant | Surfactant | — | — | — | — |
| | Chemical formula VII (Silface SAG-013) | — | — | — | — |
| | Chemical formula VIII (Silface SJM-003) | — | — | — | — |
| | Chemical formula VIII (Silface SAG-503A) | — | — | — | — |
| | Chemical formula VIII (BYK-348) | — | — | — | — |
| | Chemical formula IX (TEGO Wet 270) | 2.00 | — | — | 0.50 |

TABLE 3-6-continued

| Component (percent by mass) | | Comparative Example 5 | Comparative Example 6 | Comparative Example 7 | Comparative Example 8 |
|---|---|---|---|---|---|
| | Chemical formula IV (Newcol NT-5) | — | — | — | — |
| | Chemical formula IV (NOIGEN XL-40) | — | 2.00 | — | — |
| | Chemical formula IV (NOIGEN DX-50) | — | — | — | — |
| | Chemical formula IV (NOIGEN ET-65) | — | — | — | — |
| | Chemical formula XIV (Synthesis Example 1: A-1) | — | — | — | — |
| | Chemical formula XIV (Synthesis Example 6: A-6) | — | — | — | — |
| | Chemical formula XIV (Synthesis Example 9: A-9) | — | — | — | — |
| | Surfynol 104E | — | — | 1.00 | 0.50 |
| | Fluorochemical nonionic surfactant (Capstone ™ FS-3100 (manufactured by E.I. du Pont de Nemours and Company) | — | — | — | — |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | 0.40 | 0.40 | — | — |
| | 2,5,8,11-tetramethyldodecane-5,8-diol | — | — | 0.40 | 0.40 |
| pH regulator | 2-amino-2-ethyl-1,3-propane diol | 0.20 | 0.20 | 0.10 | 0.10 |
| Wax | Polyethylene wax 1 (AQUACER531) | — | — | 0.22 | 0.22 |
| | Polyethylene wax 2 (AQUACER515) | 0.43 | 0.43 | — | — |
| | Polyethylene wax 3 (AQUACER 3RC 1452) | — | — | — | — |
| Pure water | | Balance | Balance | Balance | Balance |
| Total (Percent by mass) | | 100 | 100 | 100 | 100 |

TABLE 3-7

| Component (percent by mass) | | Comparative Example 9 | Comparative Example 10 | Comparative Example 11 | Comparative Example 12 |
|---|---|---|---|---|---|
| Water-dispersible coloring material (pigment dispersion) | Water-dispersible coloring material (pigment dispersion) | — | — | — | — |
| | Preparation Example 2 (C.I.Pigment Yellow 74) | — | — | — | — |
| | Preparation Example 3 (C.I.Pigment Red 122) | 34.29 | 34.29 | 34.29 | 34.29 |
| | Preparation Example 4 (C.I.Pigment Blue 15:3) | — | — | — | — |
| | Preparation Example 5 (Carbon black Nipex 150) | — | — | — | — |
| | Preparation Example 6 (C.I.Pigment Red 122) | — | — | — | — |
| | Preparation Example 7 (C.I.Pigment Blue 15:3) | — | — | — | — |

TABLE 3-7-continued

| Component (percent by mass) | | Comparative Example 9 | Comparative Example 10 | Comparative Example 11 | Comparative Example 12 |
|---|---|---|---|---|---|
| | Preparation Example 8 surface reformed black pigment dispersion (1) | — | — | — | — |
| | Preparation Example 9 surface reformed magenta pigment dispersion (1) | — | — | — | — |
| | Preparation Example 10 surface reformed cyan pigment dispersion (1) | — | — | — | — |
| | Preparation Example 11 surface reformed yellow pigment dispersion (1) | — | — | — | — |
| Water-dispersible resin | Water-dispersible resin | — | — | — | — |
| | Resin emulsion 2 (Tg: 15° C.) | — | — | — | — |
| | Resin emulsion 3 (Tg: 30° C.) | — | — | — | — |
| | Resin emulsion 4 (Tg: 45° C.) | 12.66 | 12.66 | 12.66 | 12.66 |
| | Resin emulsion 5 (Tg: 70° C.) | — | — | — | — |
| Organic solvent | Organic solvent | | | | |
| | Chemical structure (I) 3-n-buthoxy-N,N-dimethyl propanamide (SP value: 9.03) | — | — | — | — |
| | Chemical structure (III) 3-n-hexyloxy-N,N-dimethyl propanamide (SP value: 8.96) | — | — | — | — |
| | Chemical structure (IV) 3-ethyl-3-hydroxyl methyl oxetane (SP value: 11.3) | — | — | — | — |
| | Chemical structure (V) 3-Methyl-3-hydroxyl methyl oxetane (SP value: 11.79) | — | — | — | — |
| | 3-Methyl-1,3-butane diol (SP value: 12.05) | 30.00 | 30.00 | 30.00 | 30.00 |
| | 1,2-butane diol (SP value: 12.75) | — | — | — | — |
| | 1,2-Propane diol (SP value: 13.5) | — | — | — | — |
| | Triethylene glycol butyhlmethyl ether (SP value: 8.41) | — | — | — | — |
| Humectant | Glycerin (SP value: 16.38) | 10.00 | 10.00 | 10.00 | 10.00 |
| | Triethylene glycol (SP value: 15.4) | — | — | — | — |
| Permeating agent | 2-ethyl-1,3-hexanediol (SP value: 10.6) | 2.00 | 2.00 | 2.00 | 2.00 |
| | 2,2,4-trimethyl-1,3-pentanediol (SP value: 10.8) | — | — | — | — |
| Surfactant | Surfactant | — | — | — | — |
| | Chemical formula VII (Silface SAG-013) | — | — | — | — |
| | Chemical formula VIII (Silface SJM-003) | — | — | — | — |

TABLE 3-7-continued

| Component (percent by mass) | | Comparative Example 9 | Comparative Example 10 | Comparative Example 11 | Comparative Example 12 |
|---|---|---|---|---|---|
| | Chemical formula VIII (Silface SAG-503A) | — | — | — | — |
| | Chemical formula VIII (BYK-348) | — | — | — | — |
| | Chemical formula IX (TEGO Wet 270) | — | 0.50 | — | — |
| | Chemical formula IV (Newcol NT-5) | — | — | — | — |
| | Chemical formula IV (NOIGEN XL-40) | 0.50 | — | 0.50 | — |
| | Chemical formula IV (NOIGEN DX-50) | — | — | — | — |
| | Chemical formula IV (NOIGEN ET-65) | — | — | — | — |
| | Chemical formula XIV (Synthesis Example 1: A-1) | — | — | — | — |
| | Chemical formula XIV (Synthesis Example 6: A-6) | — | — | — | — |
| | Chemical formula XIV (Synthesis Example 9: A-9) | — | — | — | — |
| | Surfynol 104E | 0.50 | — | — | 0.50 |
| | Fluorochemical nonionic surfactant (Capstone™ FS-3100 (manufactured by E.I. du Pont de Nemours and Company) | — | 0.50 | 0.50 | 0.50 |
| Mildew-proofing agent | Proxel GXL | 0.05 | 0.05 | 0.05 | 0.05 |
| Foam Inhibitor (Defoaming Agent) | 2,4,7,9-tetramethyldecane-4,7-diol | — | — | — | — |
| | 2,5,8,11-tetramethyldodecane-5,8-diol | 0.40 | 0.40 | 0.40 | 0.40 |
| pH regulator | 2-amino-2-ethyl-l,3-propane diol | 0.10 | 0.10 | 0.10 | 0.10 |
| Wax | Polyethylene wax 1 (AQUACER 531) | 0.22 | 0.22 | 0.22 | 0.22 |
| | Polyethylene wax 2 (AQUACER515) | — | — | — | — |
| | Polyethylene wax 3 (AQUACER 3RC 1452) | — | — | — | — |
| | Pure water | Balance | Balance | Balance | Balance |
| | Total (Percent by mass) | 100 | 100 | 100 | 100 |

Abbreviations shown in Tables 3-1 to 3-7 represent as follows:

Organic solvent (3-n-buthoxy-N,N-dimethyl propanamide) represented by the following Chemical structure I

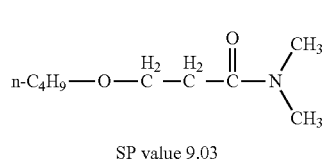

SP value 9.03

Organic solvent (3-ethyl-3-hydroxymethyl oxetane) represented by the following Chemical structure IV Chemical structure IV

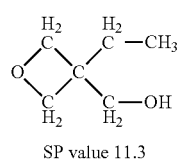

SP value 11.3

Surfactants of Silface SAG002, Silface AG013, Silface SJM003, and Silface SAG503A are polyether-modified siloxane compounds (effective component of 100 percent by mass, manufactured by Nissin Chemical co., ltd.

Surfactant of BYK-348: polyether-modified siloxane compound (effective component of 100 percent by mass, manufactured by BYK Japan KK.)

Surfactant of TEGO Wet 270: polyether-modified siloxane compound (effective component of 100 percent by mass, manufactured by Evonik Industries AG)

Surfactant of Newcol NT-5: aliphatic alcohol alkylene oxide compound (effective component of 100 percent by mass, manufactured by Nippon Nyukazai Co., Ltd.)

Surfactant: NOIGEN XL-40: aliphatic alcohol alkylene oxide compound (effective component of 100 percent by mass, manufactured by DKS Co. Ltd.)

Surfactant of Newcol TDX-50: aliphatic alcohol alkylene oxide compound (effective component of 100 percent by mass, manufactured by Nippon Nyukazai Co., Ltd.)

Surfactant of NOIGEN ET-65: aliphatic alcohol alkylene oxide compound (effective component of 100 percent by mass, manufactured by Nippon Nyukazai Co., Ltd.)

Surfactant: Surfynol 104E: acetylene glycol compound (effective component of 50 percent by mass, manufactured by Nisshin Chemical Co., Ltd.)

PROXEL GXL: mildew-proofing agent mainly composed of 1,2-benzisothiazolin-3-one (component: 20% by mass, containing dipropylene glycol, manufactured by Lonza Group AG)

Wax 1: AQUACER 531 (oxidized polyethylene wax emulsion, effective component of 45 percent by mass, manufactured by BYK Japan KK.).

Wax 2: AQUACER 515 (oxidized polyethylene wax emulsion, effective component of 35 percent by mass, manufactured by BYK Japan KK.).

Wax 3: AQUACER 3RC 1452 (oxidized polyethylene wax emulsion, effective component of 32 percent by mass, manufactured by BYK Japan KK.).

Properties of the inks prepared in Examples 1 to 18 and Comparative Examples 1 to 12 were measured in the following manner. The results are shown in Table 4.

Measuring of Viscosity

Viscosity of the ink was measured by a viscometer (RE-550 L, manufactured by TOKI SANGYO CO., LTD.) at 25 degrees C.

Measuring of pH pH of the ink was measured at 25 degrees C. using a pH meter (HM-30R type, manufactured by DKK-TOA CORPORATION).

Measuring of Dynamic Surface Tension

Dynamic surface tension of the ink of the present disclosure was measured at 25 degrees C. at a surface life of 15 msec by SITA_DynoTester (manufactured by SITA Messtechnik GmbH) as measured by maximum bubble pressure technique.

Static Surface Tension

Static surface tension of each ink was measured at 25 degrees C. using an automatic surface tensiometer (DY-300, manufactured by KYOWA INTERFACE SCIENCE Co., Ltd.).

Foam Producing Property and Defoamability

Foam producing and defoamability test was used as a substitution test for printer initial filling property and maintenance property.

1. Foamabilitty 10 ml of evaluation ink was loaded in 100 mL measuring cylinder. Thereafter, the measuring cylinder was dipped in a hemathermal water tank at 10 degrees C. for 30 minutes or longer to stabilize the liquid temperature of the ink to be evaluated. Thereafter, an air infusion tube having an inner diameter of 1 mm was attached to the measuring cylinder and the front end of the air infusion tube was attached at 5 mm from the base of the ink. Moreover, the air pressure of a pressure device was set at 20 gf/cm$^2$, and the height of the foam was measured by scale of the measuring cylinder at 30 seconds measured by a stopwatch after the valve of the pressure device was opened. Foam producing property was evaluated according to the following criteria.

Example: when the scale indicates 100 mL, the record is 90 mL {100-10 (sample amount)}

If the height of foam reaches less than 30 seconds, the foam producing test is aborted.

Evaluation Criteria

A: Height of foam: less than 50 mL
B: Height of foam from 50 to 90 mL
C: Height of foam reached 100 mL less than 30 seconds 2. Defoamability In the foam producing test, after blowing air into the measuring cylinder for 30 seconds, the valve of the pressure device was quickly closed to observe foams naturally disappearing and the height of the foam was measured at 300 seconds.

Evaluation Criteria

A: Less, than 50 mL immediately after cease of blowing air
B: Less than 50 mL at 300 seconds
C: Not less than 50 mL at 300 seconds

TABLE 4

| | Ink Property values | | | | | |
|---|---|---|---|---|---|---|
| | Viscosity (mPa · s) | pH | 15 msec dynamic surface tension (mN/m) | Static surface tension (mN/m) | Foamability | Defoamability |
| Example 1 | 8.2 | 9.5 | 31.7 | 23.5 | B | B |
| Example 2 | 9.6 | 9.6 | 32.5 | 24.3 | B | A |
| Example 3 | 8.5 | 9.7 | 33.7 | 30.5 | A | A |
| Example 4 | 8.6 | 9.7 | 33.9 | 30.7 | A | A |
| Example 5 | 8.4 | 9.4 | 33.3 | 29.4 | A | A |
| Example 6 | 8.2 | 9.7 | 31.9 | 23.4 | B | A |
| Example 7 | 8.4 | 9.7 | 32.6 | 24.6 | A | A |
| Example 8 | 8.2 | 9.5 | 29.8 | 21.6 | B | A |
| Example 9 | 7.3 | 9.2 | 32.9 | 24.8 | A | A |
| Example 10 | 7.4 | 9.5 | 32.4 | 24.1 | A | A |
| Example 11 | 8.1 | 9.6 | 32.1 | 23.3 | B | A |
| Example 12 | 8.2 | 9.5 | 31.8 | 23.5 | A | A |
| Example 13 | 8.4 | 9.4 | 31.9 | 23.2 | B | A |
| Example 14 | 9.2 | 9.6 | 31.7 | 23.6 | B | A |
| Example 15 | 9.3 | 9.5 | 31.4 | 22.9 | B | A |
| Example 16 | 8.6 | 9.3 | 33.5 | 30.1 | A | A |
| Example 17 | 7.6 | 9.5 | 32.5 | 24.4 | A | A |
| Example 18 | 4.0 | 9.6 | 32.0 | 23.9 | A | A |
| Comparative Example 1 | 6.9 | 9.3 | 33.3 | 30.7 | A | A |
| Comparative Example 2 | 7.6 | 9.4 | 33.5 | 31.0 | A | A |
| Comparative Example 3 | 8.4 | 9.0 | 30.1 | 21.5 | C | B |
| Comparative Example 4 | 8.3 | 9.1 | 34.8 | 31.7 | A | A |
| Comparative Example 5 | 7.9 | 9.4 | 29.9 | 20.9 | C | B |
| Comparative Example 6 | 7.8 | 9.4 | 34.8 | 31.6 | A | A |
| Comparative Example 7 | 8.7 | 9.2 | 30.5 | 26.3 | A | A |
| Comparative Example 8 | 8.7 | 9.4 | 30.9 | 22.3 | B | C |
| Comparative Example 9 | 8.8 | 9.3 | 31.2 | 27.3 | A | A |
| Comparative Example 10 | 8.9 | 9.1 | 29.2 | 20.3 | C | C |
| Comparative Example 11 | 8.8 | 9.2 | 30.5 | 21.6 | C | C |
| Comparative Example 12 | 8.9 | 9.0 | 29.7 | 20.9 | C | C |

Image Forming

In an environment at 22.5 to 23.5 degrees C. and 45 to 55 percent RH, using an image forming apparatus (IPSiO GXe-5500, manufactured by RICOH CO., LTD.), the drive voltage of the piezo element was changed to discharge the same amount of ink in order to attach the same amount of the ink onto OK topcoat+(weight: 104.7 g/m$^2$, OJI PAPER CO., LTD.) as recording medium.

Next, properties were evaluated in the following manner regarding Examples 1 to 18 and Comparative Examples 1 to 12. The results are shown in Table 5.

Image Density

The chart including a "black square" of a 64 point text prepared by Microsoft Word 2000 was printed on MyPaper (manufactured by RICOH CO., LTD.) as recording medium and the color of the black square portion on the print surface was measured by spectrodensitometer (X-Rite 939, manufactured by X-Rite Inc.) and evaluated according to the following criteria. The print mode used was: a modified mode in which "Plain Paper—Standard Fast" was modified to "No color calibration" at the user setting for plain paper by a driver installed onto the printer. "Black square" A is a text (symbol) of a square painted black, which is inevitably referred to because no character is available to represent it.

Evaluation Criteria
- A: Black: 1.25 or greater, Yellow: 0.8 or greater, Magenta: 1.00 or greater, Cyan: 1.05 or greater
- B: Black: 1.20 to less than 1.25, Yellow: 0.75 to less than 0.8, Magenta: 0.95 to less than 1.00, Cyan: 1.00 to less than 1.05
- C: Black: 1.15 to less than 1.20, Yellow: 0.70 to less than 0.75, Magenta: 0.90 to less than 0.95, Cyan: 0.95 to less than 1.00
- D: Black: less than 1.15, Yellow: less than 0.70, Magenta: less than 0.95, Cyan: less than 0.95

Beading

The recording medium was changed to OK TOP COAT+ (weight: 104.7 g/m$^2$, manufactured by OJI PAPER CO., LTD.) and the print mode used was modified from "Gloss paper—Aesthetic" to "No Color Calibration" by the driver installed onto the printer. Solid images were printed in the same manner as in the evaluation of image density to visually check density uniformity (beading) of the solid image and evaluated according to the following criteria.

Evaluation Criteria
- A: Not at all
- B: Slightly observed
- C: Fairly observed
- D: Significantly observed Since the black solid image was very difficult for visual confirmation, it was observed by an optical microscope with a magnifying power of 40 times.

Discharging Stability 1: Intermittent Discharging Evaluation

A chart of solid image having an area ratio of 5 percent of A4 size paper per color created by MICROSOFT WORD 2000 was continuously printed on MyPaper (manufactured by RICOH CO., LTD.) with a run length of 200 sheets. Disturbance of ink discharging by each nozzle after the printing was observed to evaluate discharging stability according to the following criteria. The print mode used: A modified mode in which "Plain Paper—Standard Fast" was modified to "No Color Calibration" from the user setting for plain paper by the driver installed onto the printer.

Evaluation Criteria
- A: No discharging disturbance
- B: Slight discharging disturbance observed
- C: Discharging disturbance observed or no discharging observed Discharging Stability 2: Nozzle Plate Ink Repelling Time In an environment at 22.5 to 23.5 degrees C. and 45 to 55 percent RH, 50 g of each ink was loaded into a 50 mL beaker. The nozzle plate of the head used in the image forming apparatus (IPSiO GXe-5500, manufactured by RICOH CO., LTD.) was taken out, nipped by tweezers, dipped into the ink at a rate of 315 mm/minute, and taken out at the same rate to measure the ink repelling time from the ink repelling layer of the nozzle plate according to the following criteria and evaluate discharging stability according to the following criteria. The repelling ink layer of the nozzle plate was Optool DSX, manufactured by DAIKIN INDUSTRIES, Ltd.

Evaluation Criteria
- A: Ink repelling time of less than 10 seconds
- B: Ink repelling time of 10 to less than 30 seconds
- C: Ink repelling time of 30 to less than 60 seconds
- D: Ink repelling time of 60 seconds or longer If the ink repelling time is long, the nozzle plate is easily wet by the ink so that the nozzle omission tends to occur in a continuous discharging evaluation.

Initial Filling Property

An inkjet printer (IPSiO GXe-5500, manufactured by RICOH CO., LTD.) which was filled with no ink was filled with the ink. Immediately after the ink filling, the nozzle check pattern was printed based on print setting maintenance to check nozzle omission and evaluate the initial filling property according to the following evaluation criteria.

Evaluation Criteria
- A: No nozzle omission
- B: less than 10 non-discharging nozzles
- C: 10 or more no non-discharging nozzles Fixability I The recording medium was changed to OK TOP COAT+ (weight: 104.7 g/m$^2$, manufactured by OJI PAPER CO., LTD.) and the print mode used was modified from "Gloss paper—Fast" to "No Color Calibration" by the driver installed onto the printer and solid images were printed and dried for 30 seconds by a natural convection type drier in which the inner temperature was set at 100 degrees C. Thereafter, the solid image was abraded 20 times out and home with white paper (OK TOPCOAT+) set in an abrasion tester (Clockmeter, manufactured by TOYO SEIKI KOGYO CO. LTD.). Density of the contamination on the abraded white paper was measured by a spectrodensitometer (X-Rite 939, manufactured by X-Rite Inc.) to evaluate fixability according to the following criteria. The background density of the recording medium was excluded from the density of the contamination.

Evaluation Criteria
- A: Less than 0.1
- B: 0.1 to less than 0.3
- C: 0.3 to less than 0.5
- D: 0.5 or greater Fixability II The recording medium was changed to OK TOP COAT+ (weight: 104.7 g/m$^2$, manufactured by OJI PAPER CO., LTD.) and the print mode used was modified from "Gloss paper—Fast" to "No Color Calibration" by the driver installed onto the printer. Solid images were printed and dried for 10 seconds by a natural convection type drier in which the inner temperature was set at 100 degrees C. Thereafter, the solid image was overlapped on white paper OK TOPCOAT+ and left in an environment of 25 degrees C. and 50 percent RH under a load of 0.5 kg/cm$^2$ for two hours. Thereafter, the overlapped solid image and the white paper were peeled off and the area of the solid image transferred onto the white paper was visually observed to evaluate fixability according to the following criteria.

Evaluation Criteria
A: No transfer observed
B: Minute point image transferred
C: Image slightly transferred
D: Image transferred

TABLE 5

|  | Image Density | Beading | Discharging stability-1 Intermittent discharging evaluation | Discharging stability-2 Ink repelling time | Initial filling property | Fixability I | Fixability II |
|---|---|---|---|---|---|---|---|
| Example 1 | B | A | A | B | B | B | B |
| Example 2 | B | A | A | A | A | B | B |
| Example 3 | B | A | A | A | A | B | B |
| Example 4 | B | B | A | A | A | B | A |
| Example 5 | A | A | A | A | A | A | A |
| Example 6 | A | A | A | B | B | A | B |
| Example 7 | A | A | A | A | A | A | B |
| Example 8 | A | A | A | A | B | A | A |
| Example 9 | A | A | A | A | A | A | A |
| Example 10 | A | A | A | A | A | A | A |
| Example 11 | A | A | A | A | A | A | A |
| Example 12 | A | A | A | A | A | A | A |
| Example 13 | A | A | A | A | A | A | A |
| Example 14 | A | A | A | A | A | B | B |
| Example 15 | A | A | A | A | A | B | B |
| Example 16 | A | A | A | A | A | A | A |
| Example 17 | A | A | A | A | A | A | A |
| Example 18 | A | A | A | A | A | A | A |
| Comparative Example 1 | B | C | A | A | A | D | D |
| Comparative Example 2 | C | C | A | A | A | D | D |
| Comparative Example 3 | A | A | C | D | D | A | A |
| Comparative Example 4 | C | D | B | A | A | A | A |
| Comparative Example 5 | A | B | C | D | D | A | A |
| Comparative Example 6 | C | D | B | A | A | A | A |
| Comparative Example 7 | A | C | A | A | A | B | C |
| Comparative Example 8 | A | A | B | C | B | B | C |
| Comparative Example 9 | B | C | A | A | A | B | C |
| Comparative Example 10 | A | A | C | D | D | B | C |
| Comparative Example 11 | A | A | C | D | D | B | C |
| Comparative Example 12 | A | A | C | D | D | B | C |

REFERENCE SIGNS LIST

101 Inkjet recording device
102 Sheet feeder tray
103 Ejection tray
104 Ink cartridge installation unit
105 Operation unit
111 Top cover
112 Front cover
115 Ink cartridge front cover
131 Guide rod
132 Stay
133 Carriage
134 Recording head
135 Sub tank
141 Sheet loading unit (pressure plate)
142 Sheet
143 Half-moon shape roller (sheet feeding roller)
144 Separation pad
145 Guide
151 Conveying belt
152 Counter roller
153 Conveying guide
154 Pressure member
155 Front end pressure roller
156 Charging roller
157 Conveying roller
158 Tension roller
161 Guiding member
171 Separation claw
172 Ejection roller
173 Ejection roller
181 Duplex printing sheet feeding unit
182 Bypass sheet feeding unit
200 Ink cartridge
241 Ink bag
242 Ink inlet
243 Ink outlet
244 Cartridge housing

The invention claimed is:

1. An ink set comprising:
   a yellow ink;
   a magenta ink; and a cyan ink,
   wherein each ink comprises at least one kind of polyether-modified siloxane compound and at least one kind of aliphatic alcohol alkylene oxide compound, wherein a mass ratio (the polyether-modified siloxane compound the aliphatic alcohol alkylene oxide compound) of the polyether-modified siloxane compound to the aliphatic alcohol alkylene oxide compound is from 20/80 to 40/60,
   wherein the polyether-modified siloxane compound is at least one member selected from the group consisting of compounds represented by the following Chemical formula III, Chemical formula III
   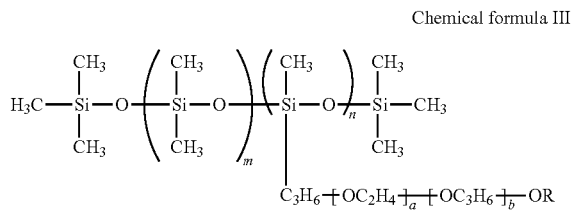

where m represents 0 or an integer of from 1 to 23 and n represents an integer of from 1 to 10, a represents an integer of from 1 to 23 and b represents 0 or an integer of from 1 to 23, and R represents a hydrogen atom or an alkyl group having 1 to 4 carbon atoms.

2. The ink set according to claim 1, wherein the compound represented by Chemical formula III is represented by any one of the following Chemical formulae VI to IX, Chemical formula VI
   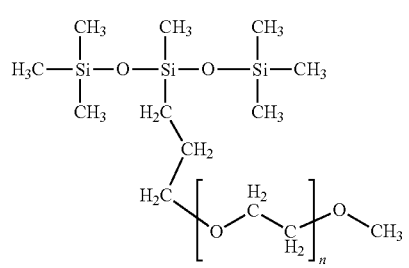

where n represents an integer of from 2 to 17,

Chemical formula VII
   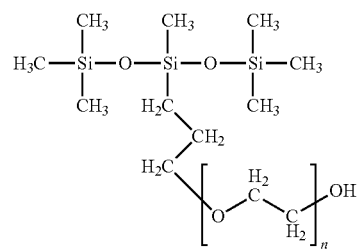

where n represents an integer of from 2 to 17,

Chemical formula VIII
   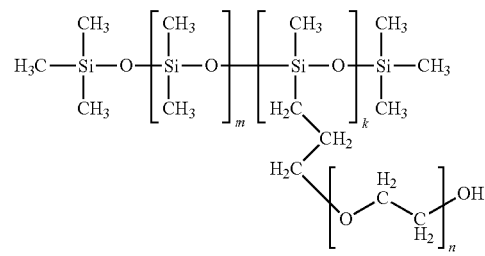

where k represents an integer of from 1 to 2, m represents 0 or an integer of from 1 to 5, and n represents an integer of from 3 to 17, Chemical formula IX
   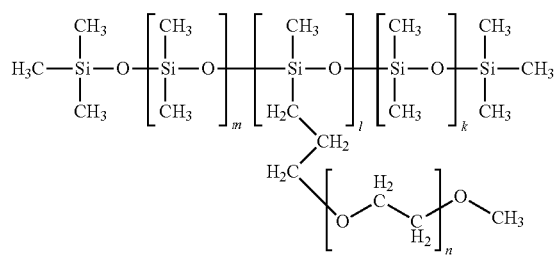

where, k+m represents 0 or an integer of from 1 to 7, l represents an integer of from 1 to 2, and n represents an integer of from 2 to 16.

3. The ink set according to claim 1, wherein the polyether-modified siloxane compound is at least one member selected from the group consisting of compounds represented by the following Chemical formula X to XII, Chemical formula X
   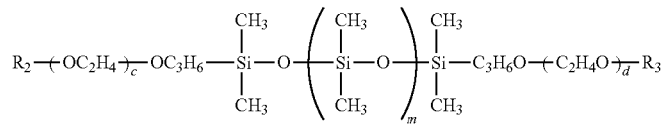

where m represents an integer of from 1 to 8 and c and d each, independently represent integers of from 1 to 10, and $R_2$ and $R_3$ each, independently represent hydrogen atoms or alkyl groups having 1 to 4 carbon atoms, Chemical formula XI

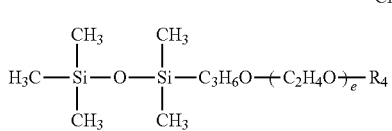

where e represents an integer of from 1 to 8 and $R_4$ represents a hydrogen atom or an alkyl group having 1 to 4 carbon atoms, Chemical formula XII

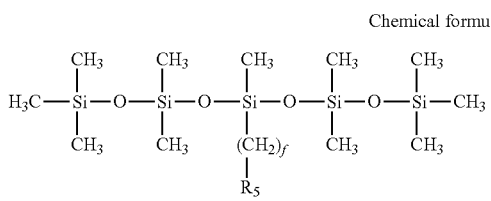

where f represents an integer of from 1 to 8, $R_5$ represents a polyether group represented by the following chemical formula A, Chemical formula A

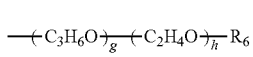

where g represents 0 or an integer of from 1 to 23 and h represents 0 or an integer of from 1 to 23, excluding a case in which g and h are 0 at the same time, and $R_6$ represents a hydrogen atom or an alkyl group having 1 to 4 carbon atoms.

4. The ink set according to claim 1, wherein the poly ether-modified, siloxane compound is at least one member selected from the group consisting of compounds represented by the following Chemical formula III,
wherein the aliphatic alcohol alkylene oxide compound is at least one member selected from the group consisting of compounds represented by the following Chemical formula IV, Chemical formula III

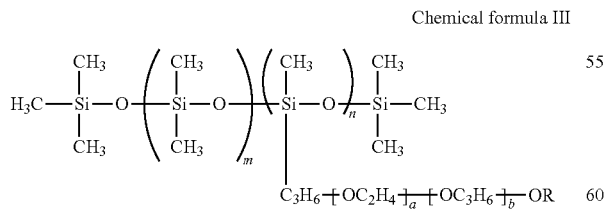

where m represents 0 or an integer of from 1 to 23 and n represents an integer of from 1 to 10, a represents an integer of from 1 to 23 and h represents 0 or an integer of from 1 to 23, and R represents a hydrogen atom or an alkyl group having 1 to 4 carbon atoms, Chemical formula IV

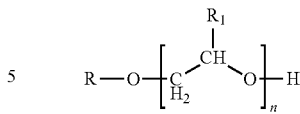

where R represents an alkyl group having 8 to 13 carbon atoms, $R_1$ represents a hydrogen atom or a methyl group, and n represents an integer of from 2 to 12.

5. The ink set according to claim 1, wherein the polyether-modified siloxane compound accounts for 0.01 to 2 percent by mass of each ink.

6. The ink set according to claim 1, wherein at least one ink further comprises at least one kind of the compound represented by the following Chemical formula V, Chemical formula 9

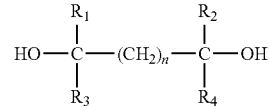

where $R_1$ and $R_2$ each, independently represent alkyl groups having 3 to 6 carbon atoms, $R_3$ and $R_4$ each, independently represent alkyl groups having one or two carbon atoms, and n represents an integer of from 1 to 6.

7. The ink se according to claim 1, further comprising a black ink comprising at least one kind of polyether-modified siloxane compound and at least one kind of aliphatic alcohol alkylene oxide compound.

8. The ink set according to claim 1, wherein each ink further comprises at least one kind of organic solvent having a solubility parameter of from 8.96 to 11.79.

9. The ink set according to claim 1, wherein the aliphatic alcohol alkylene oxide compound is at least one member selected from the group consisting of the compounds represented by the following Chemical formula IV or the group consisting of the compounds represented by the following Chemical formula XIV, Chemical formula IV

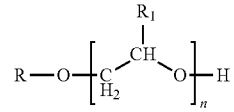

where R represents an alkyl group having 8 to 13 carbon atoms, $R_1$ represents a hydrogen atom or a methyl group, and n represents an integer of from 2 to 12, Chemical formula XIV

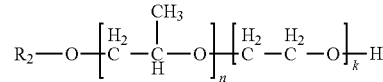

where $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation:

$3 \leq n+k \leq 14$.

10. The ink set according to claim 9, wherein each ink further comprises at least one kind of organic solvent having a solubility parameter of from 8.96 to 11.79.

11. The ink set according to claim 1, wherein at least one of the inks further comprises at least one kind of organic solvent having a solubility parameter of from 8.96 to 11.79.

12. The ink set according to claim 11, wherein the organic solvent is at least one member selected from the group consisting of compounds represented by the following Chemical formula I or the group consisting of the following Chemical formula II,

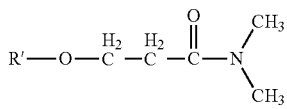

Chemical formula I where R' represents an alkyl group having 4 to 6 carbon atoms,

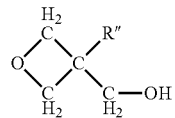

Chemical formula II where R″ represents an alkyl group having 1 to 2 carbon atoms.

13. The ink set according to claim 11, wherein the organic solvent comprises no polyhydric alcohol having an equilibrium moisture content of 30 percent or more at 23 degrees C. and a relative humidity of 80 percent.

* * * * *